(12) United States Patent
Takahashi et al.

(10) Patent No.: US 7,120,107 B1
(45) Date of Patent: Oct. 10, 2006

(54) OPTICAL HEAD FOR OPTICAL RECORDING HAVING A HOLOGRAM ELEMENT THAT GENERATES MULTIPLE DIFFRACTED LIGHT BEAMS OF DIFFERENT ORDERS

(75) Inventors: Junichi Takahashi, Tokyo (JP); Masahiko Satoh, Tokyo (JP); Akihiro Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 708 days.

(21) Appl. No.: 09/628,200

(22) Filed: Jul. 28, 2000

(30) Foreign Application Priority Data

Jul. 28, 1999 (JP) ................................ 11/213847

(51) Int. Cl.
*G11B 7/135* (2006.01)
(52) U.S. Cl. ............................ 369/112.12; 369/110.03; 369/112.19
(58) Field of Classification Search ............ 369/110.03
See application file for complete search history.

(56) References Cited

U.S. PATENT DOCUMENTS

| | | | | |
|---|---|---|---|---|
| 4,908,506 A | * | 3/1990 | Coops et al. ............ 250/201.5 |
| 4,924,079 A | * | 5/1990 | Opheij et al. ............ 250/201.5 |
| 5,122,903 A | * | 6/1992 | Aoyama et al. ............ 359/565 |
| 5,144,131 A | * | 9/1992 | Opheij et al. ................ 250/202 |
| 5,374,819 A | * | 12/1994 | Kim et al. ................ 250/201.5 |
| 5,391,865 A | * | 2/1995 | Kurata et al. ............ 250/201.5 |
| 5,570,333 A | * | 10/1996 | Katayama .............. 369/110.03 |
| 5,623,462 A | * | 4/1997 | Tezuka et al. ............ 369/44.23 |
| 5,659,531 A | * | 8/1997 | Ono et al. .................... 359/495 |
| 5,687,155 A | * | 11/1997 | Fukakusa et al. ...... 369/112.06 |
| 5,875,167 A | * | 2/1999 | Katayama .............. 369/112.07 |
| 5,905,750 A | * | 5/1999 | Lebby et al. ................. 372/50 |
| 5,946,137 A | * | 8/1999 | Momoo et al. .......... 369/44.23 |
| 5,953,304 A | * | 9/1999 | Dang et al. ............. 369/112.12 |
| 5,953,355 A | * | 9/1999 | Kiely et al. .................... 372/43 |
| 5,956,302 A | * | 9/1999 | Maeda et al. ............ 369/44.23 |
| 6,125,087 A | * | 9/2000 | Ohnishi et al. ........... 369/44.23 |
| 6,272,097 B1 | * | 8/2001 | Nakao et al. ........... 369/112.08 |
| 6,369,377 B1 | * | 4/2002 | Shih et al. ................... 250/225 |
| 6,418,098 B1 | * | 7/2002 | Yamamoto et al. ....... 369/44.41 |

(Continued)

FOREIGN PATENT DOCUMENTS

JP        62-172538        7/1987

(Continued)

*Primary Examiner*—Thang V. Tran
*Assistant Examiner*—Michael V. Battaglia
(74) *Attorney, Agent, or Firm*—Muirhead & Saturnelli, LLC

(57) ABSTRACT

An optical head is provided, which suppresses the offset in the tracking error signal. This head comprises (a) a light source for emitting a light beam to be irradiated to an optical recording medium as an incident light beam; (b) a hologram element for receiving a reflected light beam generated by reflection of the incident light beam on the medium to generate at least two diffracted light beams for focusing error detection and at least two diffracted light beams for tracking error detection; and (c) an optical detector for detecting the at lease two diffracted light beams for focusing error detection and the at least two diffracted light beams for tracking error detection; the detector including a first receiving surface for receiving the at least two diffracted light beams for focusing error detection and a second detection surface for receiving the at least two diffracted light beams for tracking error detection; each of the first and second receiving surfaces being divided into receiving regions; the at least two diffracted light beams for focusing error detection being received at the receiving regions of the first receiving surface; the at least two diffracted light beams for tracking error detection being received at the receiving regions of the second receiving surface.

14 Claims, 14 Drawing Sheets

U.S. PATENT DOCUMENTS 6,445,671 B1 * 9/2002 Takeda et al. .............. 369/121
2003/0039034 A1 * 2/2003 Hatano et al. .............. 359/576

FOREIGN PATENT DOCUMENTS

| JP | 62-277640 | 12/1987 |
| JP | 7-9708 | 2/1995 |
| JP | 8-287499 | 11/1996 |
| JP | 9-44921 | 2/1997 |
| JP | 10-208284 | 8/1998 |
| JP | 10-255318 | 9/1998 |
| JP | 10269588 A | 10/1998 |
| JP | 11-25465 | 1/1999 |
| JP | 11-45451 | 2/1999 |

* cited by examiner

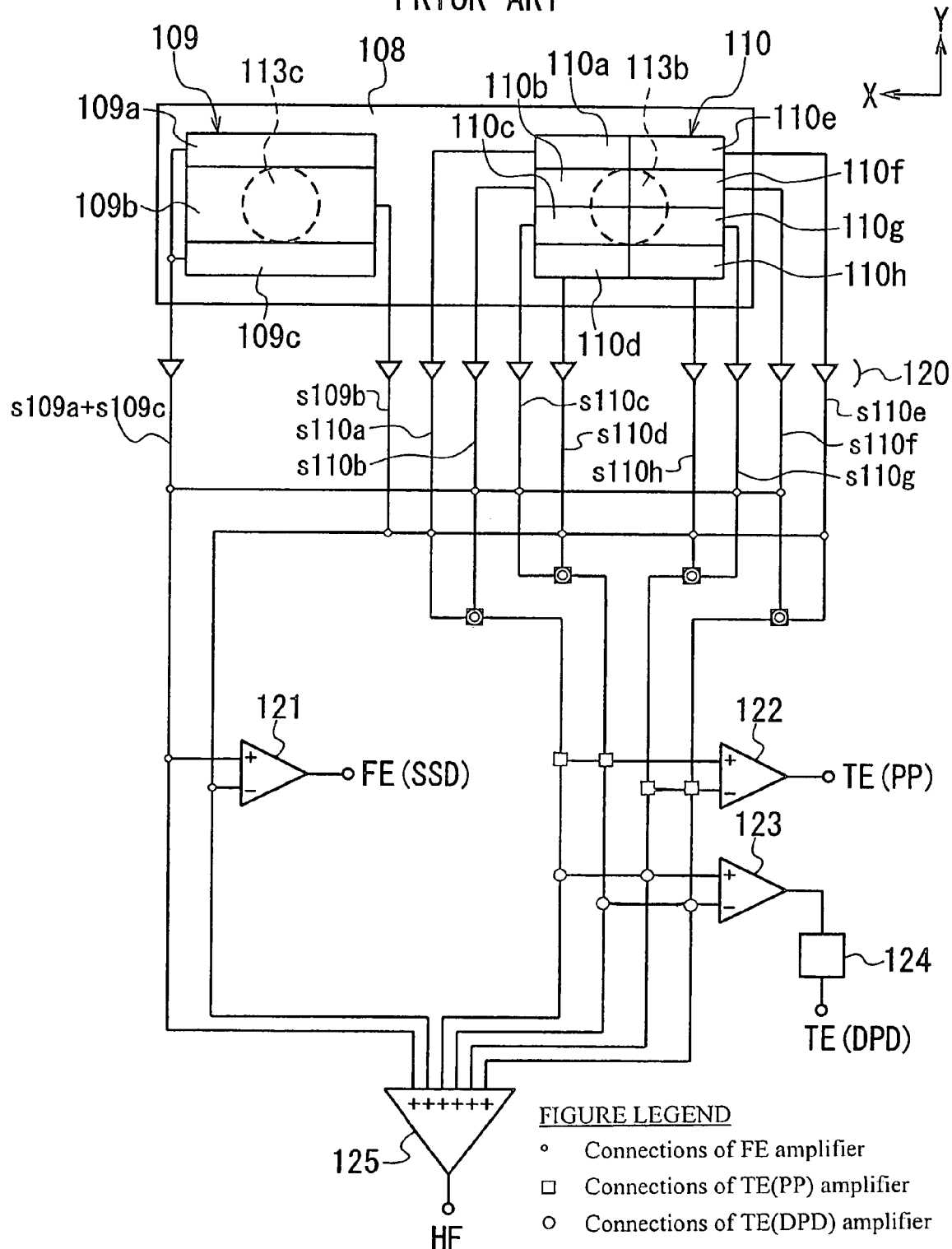

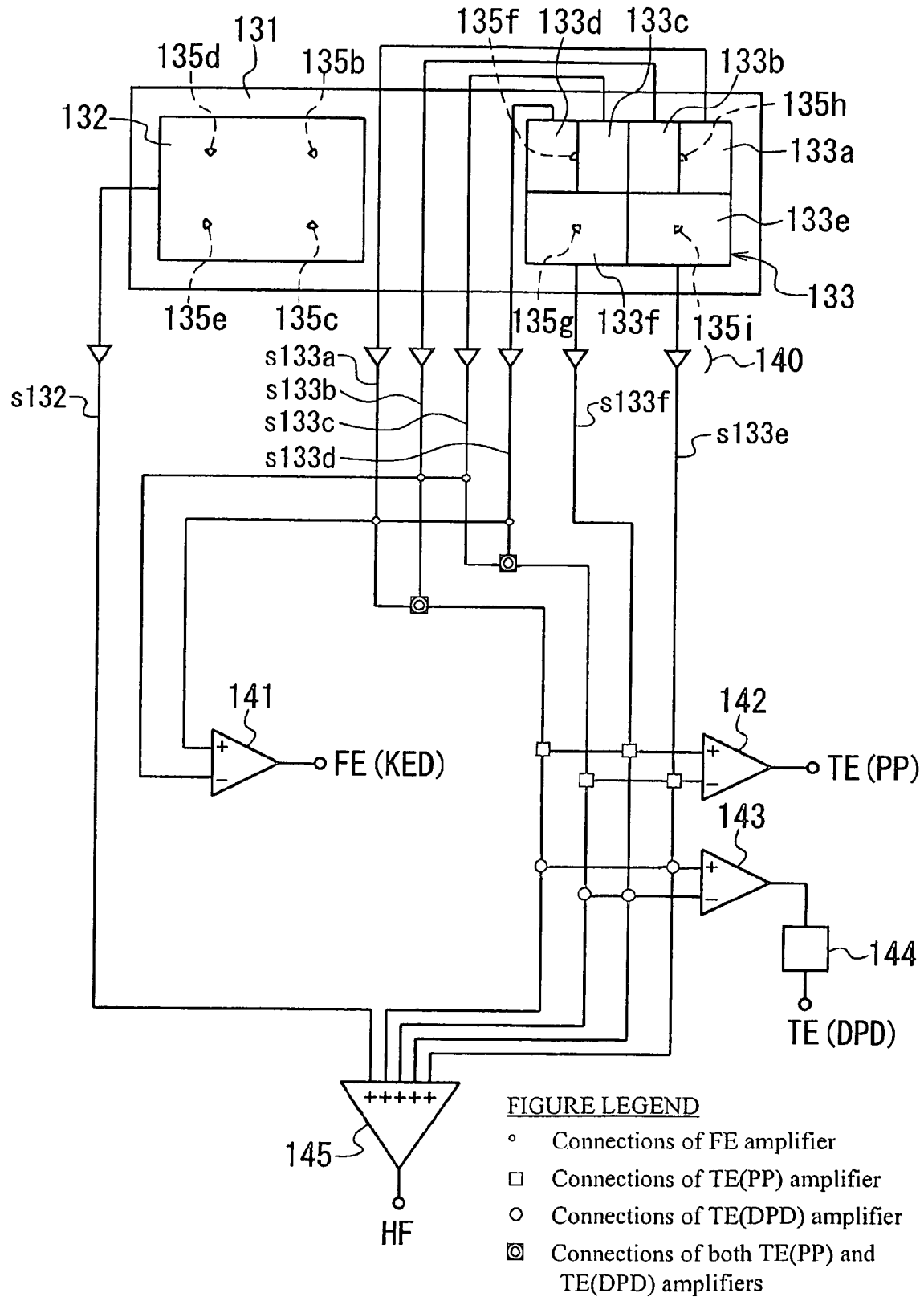

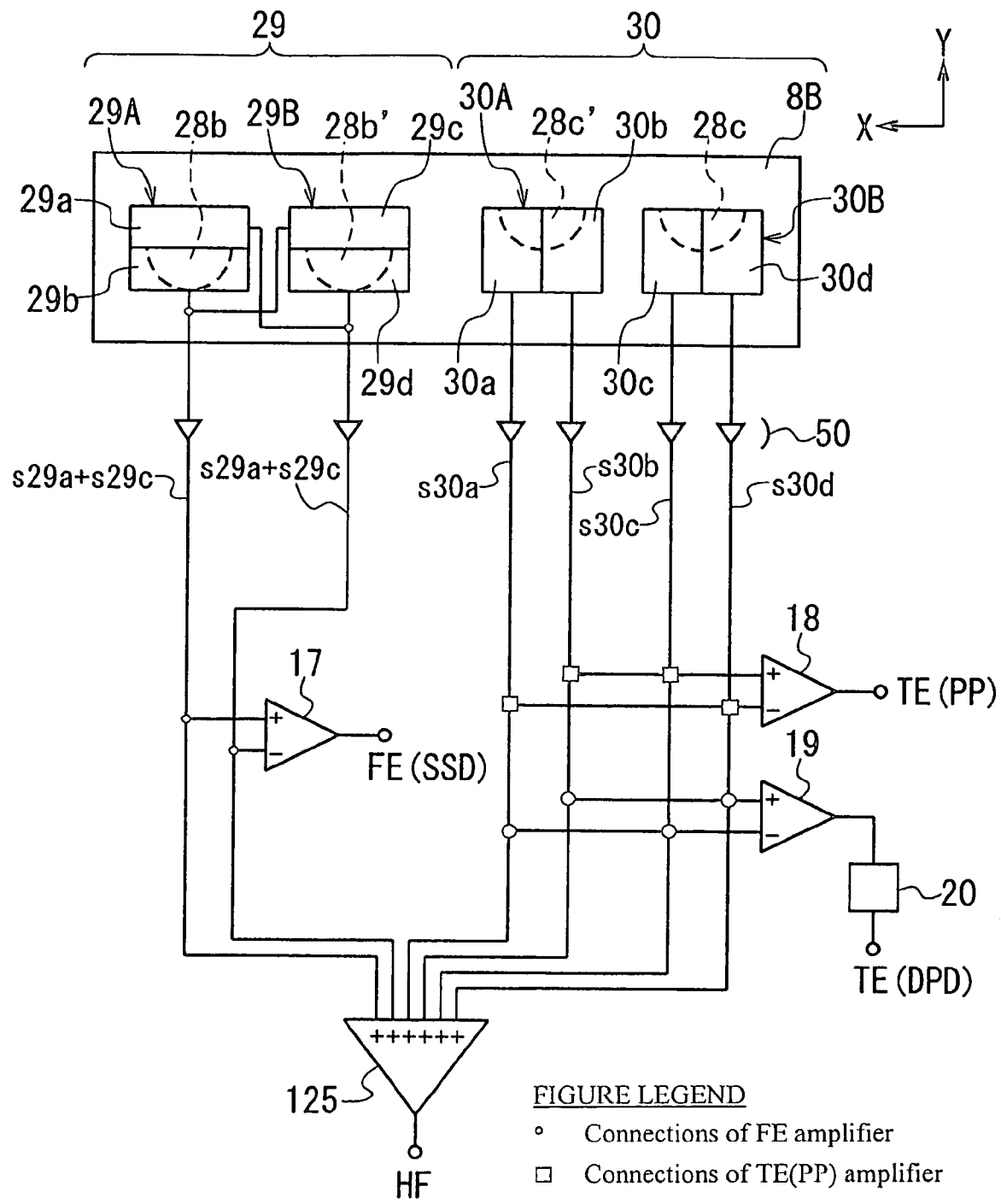

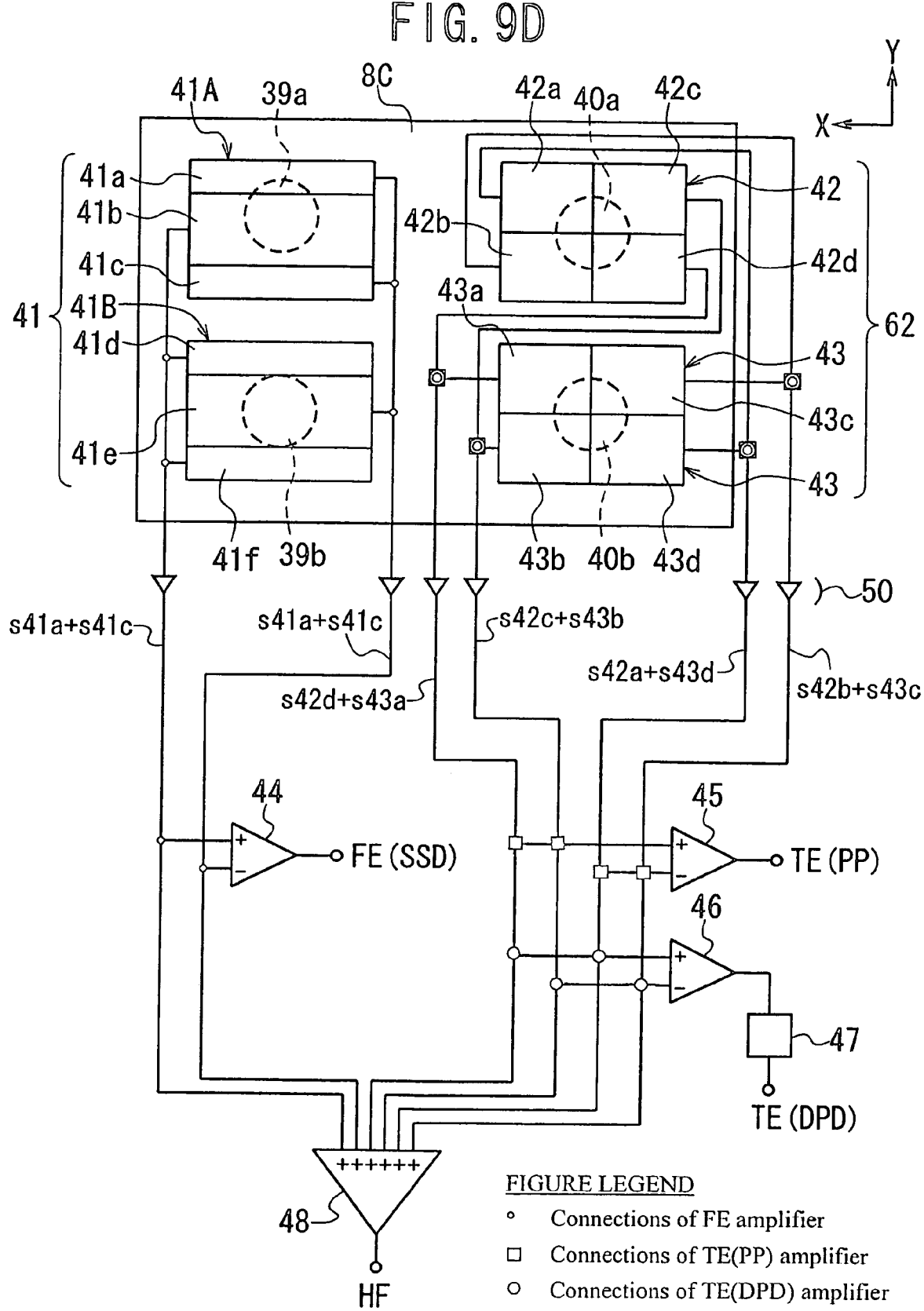

OPTICAL HEAD FOR OPTICAL
RECORDING HAVING A HOLOGRAM
ELEMENT THAT GENERATES MULTIPLE
DIFFRACTED LIGHT BEAMS OF
DIFFERENT ORDERS

BACKGROUND OF THE INVENTION

1. Field of the Invention

The present invention relates to an optical head used for optically recording information on media and/or reproducing and/or erasing the information recorded on the media, which is applicable to optical data recording or storing system using various types of optical disks.

2. Description of the Related Art

In the optical recording field, several types of optical data recording devices or systems using various optical disks, such as magneto-optical (MO) disks and compact disks (CDs), have already been practically used extensively. These optical disks have concentric or spiral recording tracks and pieces of information are optically recorded and reproduced along the tracks.

Moreover, to cope with the recent need to further increase the storage capacity, a new type of optical recording devices using digital video or versatile disks (DVDs) have been developed and put into practice.

On the other hand, there has been the strong need to downsize optical recording apparatuses and to lower their fabrication cost. To meet the need, a technique that simplifies the optical system configuration of optical heads by applying hologram elements to optical heads as one of the base or key components of optical recording apparatuses has been developed and disclosed. Examples of optical heads using this technique were disclosed in the Japanese Non-Examined Patent Publication Nos. 7-9708 published in 1995 and 10-269588 published in 1998.

FIGS. 1 and 2A to 2C show the configuration of the prior-art optical head disclosed in the Japanese Non-Examined Patent Publication No. 7-9708, in which the tracking error detection function is added to the configuration disclosed in this Publication. This head may be termed the "first prior-art optical head" later.

In FIGS. 1 and 2A to 2C, X and Y denote the radial and tangential directions of concentric or spiral tracks of a disk-shaped recording medium, respectively, and 2 denotes the longitudinal axis of the optical system in the prior-art head.

A linearly polarized light beam (i.e., an incident light beam), which is emitted from a laser diode 101 mounted on a heat sink 102, is reflected by a mirror 103 and then, enters a polarizing hologram element 104. The reason why the incident light beam is linearly polarized is to prevent it from diffracting by the element 104. The incident light beam emitted by the laser diode 101 passes through the element 104 without diffraction and then, it is converted to a circularly polarized light beam by a quarter-wave plate 105. The circularly polarized light beam thus generated is then focused by an objective lens 106 to be irradiated on a disk-shaped recording medium 107. The beam thus irradiated forms a specific spot on the medium 107.

The circularly polarized light beam thus irradiated is reflected by the medium 107, at which the beam absorbs a piece of information recorded in the area of the medium 107 corresponding to the spot. The circularly polarized light beam thus reflected passes through the objective lens 106 and then, it is converted to a linearly polarized light beam by the quarter-wave plate 105. The linearly polarized light beam thus generated is diffracted by the hologram element 104, generating not only a reproduction or playback signal beam but also a focusing error signal beam and a tracking error signal beam. The focusing and tracking error signal beams are received by a focusing error signal beam receiver 109 and a tracking error signal beam receiver 110. These two receivers 109 and 110 are formed in an optical detector 108.

The method of detecting the focusing error, tracking error, and reproduction signal beams in the first prior-art head is explained below with reference to FIGS. 2A to 2c.

The polarizing hologram element 104 is a concentric phase-type diffraction grating made by forming a proton exchange region in a proper crystal such as a lithium niobate ($LiNbO_3$) crystal. As shown in FIG. 2A, the element 104 has arc-shaped gratings whose center is offset with respect to the center of the element 104 itself.

When a reflected light beam 112 by the recording medium 107 passes through the hologram element 104, a zero-order diffracted beam (i.e., a transmitted beam) 113a is not generated while a +1st-order diffracted beam 113b is generated due to a convex lens function and a −1st-order diffracted beam 113c is generated due to a concave lens function.

The focusing error signal beam receiver 109 of the optical detector 108 has three rectangular beam receiving regions 109a, 109b, and 109c. The tracking error signal beam receiver 110 of the detector 108 has eight rectangular beam receiving regions 109a, 110b, 110c, 110d, 110e, 110f, 110g, and 110h. Thus, the detector 108 has eleven beam receiving regions in total.

The total beam receiving surface of the focusing error signal beam receiver 109 is equal in size to that of the tracking error signal beam receiver 110.

The region 109a is equal in size to the region 109c. The region 109b is twice as large in size as the region 109a or 109c. The eight regions 110a to 110h are equal in size to each other, each of which has a half size of the region 109a or 109c.

The detector 108 is located on the optical axis Z of the first prior-art head in such a way that the zero-order diffracted light beam 113a generated from the reflected light beam 112 correctly focuses on the surface of the detector 108 when the incident light beam correctly focuses on the surface of the medium 107 by the objective lens 106. Thus, when the +1st-order diffracted beam 113b and the −1st-order diffracted beam 113c are received at the middle region between the focusing and tracking error signal beam receivers 109 and 110, these two beams 113b and 113c form equal-sized circular spots on the surface of the middle region.

When the medium 107 approaches the optical head with respect to the focusing point of the objective lens 106 due to surface fluctuation of the medium 107 or the like, the focusing angle of the reflected light beam 112 entering the hologram element 104 decreases, thereby moving the focal point of the diffracted beams 113a, 113b, and 113c to be apart from the lens 106. Therefore, the spot diameter of the beam 113c on the focusing error signal beam receiver 109 increases while the spot diameter of the beam 113b on the tracking error signal beam receiver 110 decreases. Contrarily, when the medium 107 moves to be apart from the optical head with respect to the focusing point of the objective lens 106, the focusing angle of the reflected light beam 112 entering the hologram element 104 increases, thereby moving the focal point of the diffracted beams 113a, 113b, and 113c toward the lens 106. Therefore, the spot diameter of the beam 113c on the focusing error signal beam receiver 109 decreases while the spot diameter of the beam 113b on the tracking error signal beam receiver 110 increases.

Here, as shown in FIG. 2C, the electrical output signals generated by the beam receiving regions 109a, 109b, and 109c of the focusing error signal beam receiver 109 and then, current-to-voltage converted and amplified by corresponding current-to-voltage conversion amplifiers 120 are respectively defined as s109a, s109b, and s109c. Similarly, the electrical output signals generated by the beam receiving regions 110a, 110b, 110c, 110d, 110e, 110f, 110g, and 110h of the tracking error signal beam receiver 110 and then, current-to-voltage converted and amplified by corresponding current-to-voltage conversion amplifiers 120 are respectively defined as s110a, s110b, s110c, s110d, s110e, s110f, s110g, and s110h.

Then, the focusing error signal FE is produced by using the spot size detection (SSD) method in the following way.

A differential amplifier 121 is electrically connected to the beam receiving regions 109a, 109b, and 109c and the beam receiving regions 110a, 110b, 110c, 110d, 110e, 110f, 110g, and 110h, as shown in FIG. 2C. Therefore, the focusing error signal FE(SSD) is given by the following equation (1).

$$FE(SSD) = (s109a + s109c + s110b + s110c + s110f + s110g) - (s109b + s110a + s110d + s110e + s110h) \quad (1)$$

If the recording tracks of the medium 107 are deviated from their desired position due to eccentricity or the like, the radial distribution of the optical strength on the medium 107 varies. Thus, the tracking error signal TE is given by the push-pull (PP) detection method in the following way.

A differential amplifier 122 is electrically connected to the beam receiving regions 110a, 110b, 110c, 110d, 110e, 110f, 110g, and 110h, as shown in FIG. 2C. Therefore, the tracking error signal TE(PP) is given by the following equation (2).

$$TE(PP) = (s110a + s110b + s110c + s110d) - (s110e + s110f + s110g + s110h) \quad (2)$$

The tracking error signal TE may be obtained by the differential phase detection (DPD) method, in which a differential amplifier 123 and a differential phase detection circuit 124 are connected, as shown in FIG. 2c. In this case, the tracking error signal TE(DPD) is given by the following equation (3).

$$TE(DPD) = (s110a + s110b + s110g + s110h) - (s110c + s110d + s110e + s110f) \quad (3)$$

By using a summing amplifier 125, the information playback or reproduction signal HF is given by the following equation (4).

$$HF = s109a + s109b + s109c + s110a + s110b + s110c + s110d + s110e + s110f + s110g + s110h \quad (4)$$

FIGS. 3A to 3C show the configuration of the prior-art optical head disclosed in the Japanese Non-Examined Patent Publication No. 10-269588. The layout of the individual components such as the objective lens 106 is substantially the same as that shown in FIG. 1 and therefore, it is not explained here for the sake of simplification. This head may be termed the "second prior-art optical head" later.

The method of detecting the focusing error, tracking error, and playback signal beams is explained below with reference to FIGS. 3A to 3C.

A polarizing hologram element 130 has four rectangular regions 130a, 130b, 130c, and 130d, which are defined by a division line extending along the x direction (i.e., the radial direction of the recording tracks of the medium 107) and another division line extending along the Y direction (i.e., the tangential direction of the recording tracks of the medium 107). As shown in FIG. 3A, each of the regions 130a, 130b, 130c, and 130d forms a linear phase-type grating whose directions are different from the division lines.

When a reflected light beam 135 by the recording medium 107 passes through the hologram element 130, a zero-order diffracted beam 135a is not generated while four +1st-order diffracted beams 135f, 135g, 135h, and 135i are generated due to a convex lens function and four −1st-order diffracted beams 135b, 135c, 135d, and 135e are generated due to a concave lens function.

A reproducing signal beam receiver 132 of an optical detector 131 has a rectangular beam receiving region. An error signal beam receiver 133 of the optical detector 131 has six rectangular beam receiving regions 133a, 133b, 133c, 133d, 133e, and 133f. Thus, the detector 131 has seven beam receiving regions in total.

The total beam receiving region of the reproducing signal beam receiver 132 is equal in size to that of the error signal beam receiver 133.

The regions 133a, 133b, 133c, and 133d of the error signal beam receiver 133 are equal in size to each other. Each of the region of the reproduction signal beam receiver 132 and the regions 133e and 133f of the error signal beam receiver 133 is sufficiently wide for receiving the corresponding diffracted light beam.

The optical detector 131 is located on the optical axis Z of the second prior-art head in such a way that the zero-order diffracted light beam 135a generated from the reflected light beam 135 correctly focuses on the surface of the detector 131 when the incident light beam correctly focuses on the surface of the medium 107 by the objective lens 106. Each of the diffracted beams 135b, 135c, 135d, 135e, 135f, 135g, 135h, and 135i generated by the hologram element 130 has a sector-like beam shape responsive to the fact that the light 135 is irradiated to the adjoining sector-shaped regions 130a, 130b, 130c, and 130d of the hologram element 130, as shown in FIG. 3A.

The +1st-order diffracted beam 135f generated by the region 130a of the hologram element 130 is irradiated onto the division line of the beam receiving regions 133c and 133d. The +1st-order diffracted beam 135g generated by the region 130b of the element 130 is irradiated onto the division line of the beam receiving regions 133a and 133b. The +1st-order diffracted beam 135h generated by the region 130c of the element 130 is irradiated onto the beam receiving region 133e. The +1st-order diffracted beam 135i generated by the region 130d of the element 130 is irradiated onto the beam receiving region 133f. The −1st-order diffracted beams 135b, 135c, 135d, and 135e generated respectively by the regions 130a, 130b, 130c, and 130d of the element 130 are irradiated onto the beam receiving surface of the reproduction signal receiver 132.

The layout of the beam spots thus formed on the reproduction and error signal beam receivers 132 and 133 is clearly shown in FIG. 3C. Each of these beam spots has a sector-like shape with various orientations.

When the medium 107 approaches the second prior-art optical head with respect to the focusing point of the objective lens 106 due to surface fluctuation of the medium 107 or the like, the focusing angle of the reflected light beam 135 entering the hologram element 130 decreases, thereby moving the focal point of the diffracted beams 135b, 135c, 135d, 135e, 135f, 135g, 135h, and 135i to be apart from the lens 106. Therefore, the spot size of the beams 135f, 135g, 135h, and 135i on the error signal beam receiver 133 increases without changing their sector-like spot shape. Contrarily, when the medium 107 moves to be apart from the optical head with respect to the focusing point of the objective lens 106, the focusing angle of the reflected light beam 135 entering the element 130 increases, thereby moving the focal point of the diffracted beams 135b, 135c, 135d, 135e, 135f, 135g, 135h, and 135i toward the lens 106. Therefore, the spot size of the beams 135f, 135g, 135h, and 135i on the error signal beam receiver 133 decreases without changing their sector-like spot shape.

Here, as shown in FIG. 3C, the electrical output signals generated by the beam receiving regions 133a, 133b, 133c, 133d, 133e, and 133f of the error signal beam receiver 133 and then, current-to-voltage converted and amplified by corresponding current-to-voltage conversion amplifiers 140 are respectively defined as s133a, s133b, s133c, s133d, s133e, and s133f. Similarly, the electrical output signal generated by the reproducing signal beam receiver 132 and then, current-to-voltage converted and amplified by a corresponding current-to-voltage conversion amplifier 120 is defined as s132.

Then, the focusing error signal FE is produced by using the knife edge detection (KED) method in the following way.

Since a differential amplifier 141 is electrically connected to the beam receiving regions 133a, 133b, 133c, and 133d, as shown in FIG. 3C, the focusing error signal FE(KED) is given by the following equation (5).

$$FE(KED)=(s133a+S133d)-(s133b+s133c) \quad (5)$$

If the recording tracks of the medium 107 is deviated from their desired position due to eccentricity or the like, the radial distribution of the optical strength on the medium 107 varies. Thus, the tracking error signal TE is given by the push-pull (PP) detection method in the following way.

A differential amplifier 142 is electrically connected to the beam receiving regions 133a, 133b, 133c, 133d, 133e, and 133f, as shown in FIG. 3C. Therefore, the tracking error signal TE(PP) is given by the following equation (6).

$$TE(PP)-(s133a+s133b+s133f)-(s133c+s133d+s133e) \quad (6)$$

The tracking error signal TE may be obtained by the differential phase detection (DFD) method, in which a differential amplifier 143 and a differential phase detection circuit 144 are used, as shown in FIG. 3C. In this case, the tracking error signal TE(DFD) is given by the following equation (7).

$$TE(DFD)-(s133a+s133b+s133e)-(s133c+s133d+s133f) \quad (7)$$

By using a summing amplifier 145 connected as shown in FIG. 3C, the information reproduction signal HF is given by the following equation (8).

$$HF=s132-s133a-s133b+s133c+s133d+s133e+s133f \quad (8)$$

The above-explained first and second prior-art optical heads have three problems described below.

Specifically, the first problem is that the signal processing circuits is complicated and large in scale and at the same time, the electric output signals tend to be degraded in quality due to noises. This is because the count of the beam receiving regions of the optical detector is excessively large, which is explained in detail below.

With the above-explained first and second prior-art optical heads, the focusing error signal is detected through the beam size change of the +1st-order −1st-order diffracted beams generated by the hologram element 104 or 130. Therefore, each of the error signal beam receivers 109, 110, and 133 of the optical detectors 108 and 131 needs to be formed to have three or more beam receiving regions. Also, to detect the tracking error signal simultaneously with the focusing error signal, any one of the error signal beam receivers 109, 110, and 133 needs to be formed to have four beam receiving regions with the division lines extending along the radial and tangential directions (i.e., X and Y) of the disk-shaped recording medium.

Moreover, with the first prior-art optical head shown in FIGS. 1 and 2A to 2C, the optical detector 108 needs to be formed to have eleven beam receiving regions in total. Also, since the output signals of the focusing and tracking error signal receivers 109 and 110 are used for generating both the focusing and tracking error signals, buffer amplifiers (not shown in FIG. 2C) are required for the respective beam receiving regions, thereby increasing the circuit scale. Also, in this case, a lot of necessary amplifiers are configured at several stages and therefore, the quality of the focusing and tracking error signals tends to degrade due to noises occurring in the amplifiers.

The second problem is that the optical detector 131 and the hologram element 130 have to be mounted with high accuracy in the second prior-art optical head. Specifically, the reflected light beam 135 is divided into four parts by the two perpendicular division lines on the hologram element 130, generating the eight diffracted beams 135b to 135f. Thus, if the relative positional relationship between the division lines on the element 130 and the division lines on the optical detector 131 deviates from their desired relationship, the focusing and/or tracking error signal or signals tends to contain some offset and at the same time, the detection sensitivity to the focusing and/or tracking error or errors tends to lower.

The third problem is that complicated positioning operation is necessary to align the optical axes of all the optical components. Specifically, because a light source, optical elements, and optical detectors are integrated on a base, not only the optical components but also the package have to be precisely processed and finished. This raises the fabrication cost of the optical head itself.

Moreover, with the optical heads of this sort, generally, to suppress the bad effect caused by the eccentricity of a recording medium, an objective lens is shifted under control through detection of the tracking error signal. In this case, there arises a problem that some offset occurs in the tracking error signal. Also, to produce the optical heads at sufficiently low cost, there has been the need to form the package of the heads by a proper plastic material. To meet this need, it is essential to efficiently dissipate the heat emitted by a laser diode.

SUMMARY OF THE INVENTION

Accordingly, an object of the present invention is to provide an optical head that suppresses the offset in the tracking error signal.

Another object of the present invention is to provide an optical head that relaxes the necessary positional accuracy in the relative positional relationship between the package and the other optical elements.

Still another object of the present invention is to provide an optical head that simplifies the configuration of the signal processing circuits to thereby eliminate the quality degradation of the focusing and tracking error signals due to noises.

A further object of the present invention is to provide an optical head that presents a good heat dissipation performance even if the package is formed by a plastic material.

A still further object of the present invention is to provide an optical head that can be assembled easily and fabricated at low cost.

The above objects together with others not specifically mentioned will become clear to those skilled in the art from the following description.

An optical head according to the present invention comprises;

(a) a light source for emitting a light beam to be irradiated to an optical recording medium as an incident light beam;

(b) a hologram element for receiving a reflected light beam generated by reflection of the incident light beam on the medium to generate at least two diffracted light beams for focusing error detection and at least two diffracted light beams for tracking error detection; and (c) an optical detector for detecting the at least two diffracted light beams for focusing error detection at a first receiving surface and the at least two diffracted light beams for tracking error detection at a second receiving surface;

each of the first and second receiving surfaces being divided into receiving regions;

the at least two diffracted light beams for focusing error detection being received at the receiving regions of the first receiving surface;

the at least two diffracted light beams for tracking error detection being received at the receiving regions of the second receiving surface.

With the optical head according to the present invention, the hologram element generates the at least two diffracted light beams for focusing error detection and the at least two diffracted light beams for tracking error detection from the reflected light generated by reflection of the incident light beam on the optical recording medium. The optical detector detects the at least two diffracted light beams for focusing error detection at the first receiving surface and the at least two diffracted light beams for tracking error detection at the second receiving surface. Each of the first and second receiving surfaces is divided into receiving regions. The at least two diffracted light beams for focusing error detection are received at the receiving regions of the first receiving surface of the detector. The at least two diffracted light beams for tracking error detection are received at the receiving regions of the second receiving surface of the detector.

Accordingly, if the at least two diffracted light beams for tracking error detection are realized by forming a plurality of diffraction gratings on the hologram element, the equivalent size of the beam used for tracking error detection can be increased. If the at least two diffracted light beams for tracking error detection are realized by forming two diffraction gratings on the upper and lower surfaces of the hologram element, tracking error can be eliminated completely. This means that the allowable positioning margin of the optical components is increased, relaxing the relative positional relationship between the package and the other optical elements.

Also, the hologram element generates at least two diffracted light beams for focusing error detection and the at least two diffracted light beams for tracking error detection from the reflected light beam. These diffracted light beams for focusing and tracking error detection are received by the first and second receiving surfaces of the optical detector, respectively. Thus, desired focusing and tracking error detection can be achieved even if the count of the light receiving regions of each of the first and second receiving surfaces is not increased as shown in the first and second prior-art optical heads. As a result, the signal processing circuits can be simplified to suppress possible noise generation, thereby eliminating the quality degradation of focusing and tracking error detection signals. The quality degradation of the focusing and tracking error detection signals may be raised.

In the optical head according to the invention, the focusing error signal may be detected by the spot size detection method while the tracking error signal may be detected by the push-pull detection or differential phase detection method may be used.

In a preferred embodiment of the optical head according to the invention, the hologram element has a property of selectively exhibiting a diffraction grating function according to a polarization direction of the reflected light beam. In other words, the element may be termed a "polarizing hologram element", in which the element serves as a diffraction grating for extraordinary light beams while it does not serve as a diffraction grating for ordinary light beams.

In another preferred embodiment of the optical head according to the invention, the hologram element has diffraction gratings divided by at least one division line. The gratings have different gratings patterns. The diffracted light beams for focusing error detection and the diffracted light beams for tracking error detection are generated by the gratings of the element.

In still another preferred embodiment of the optical head according to the invention, the hologram element has a first diffraction grating on a surface of the element and a second diffraction grating on an opposite surface thereof. In this embodiment, there is an additional advantage that the offset in the tracking error signal can be eliminated completely.

In a further preferred embodiment of the optical head according to the invention, the light source, at least the hologram element and the optical detector are located in a package having a positioning mechanism. The package is mounted on a base using the positioning mechanism.

It is preferred that the base has a hole into which the package is inserted. An inner wall of the hole is substantially equal in shape and size to an outer wall of the package. The inner wall of the hole has an engaging part and the outer wall of the package has a corresponding engaging part. The package is positioned at a desired location with respect to the base by engagement between the engaging parts of the hole and the package.

Preferably, the package is made of a plastic material.

BRIEF DESCRIPTION OF THE DRAWINGS

In order that the present invention may be readily carried into effect, it will now be described with reference to the accompanying drawings

FIG. 2C is a schematic plan view showing the signal generation and processing of the optical detector in the prior-art optical head of FIG. 1.

FIG. 3C is a schematic plan view showing the signal generation and processing of the optical detector in the prior-art optical head of FIG. 3A.

FIG. 8C is a schematic plan view showing the signal generation and processing of the optical detector in the optical head according to the fourth embodiment of FIG. 8A.

FIG. 9D is a schematic plan view showing the signal generation and processing of the optical detector in the optical head according to the fifth embodiment of the invention.

DETAILED DESCRIPTION OF THE PREFERRED EMBODIMENTS

Figure 1:
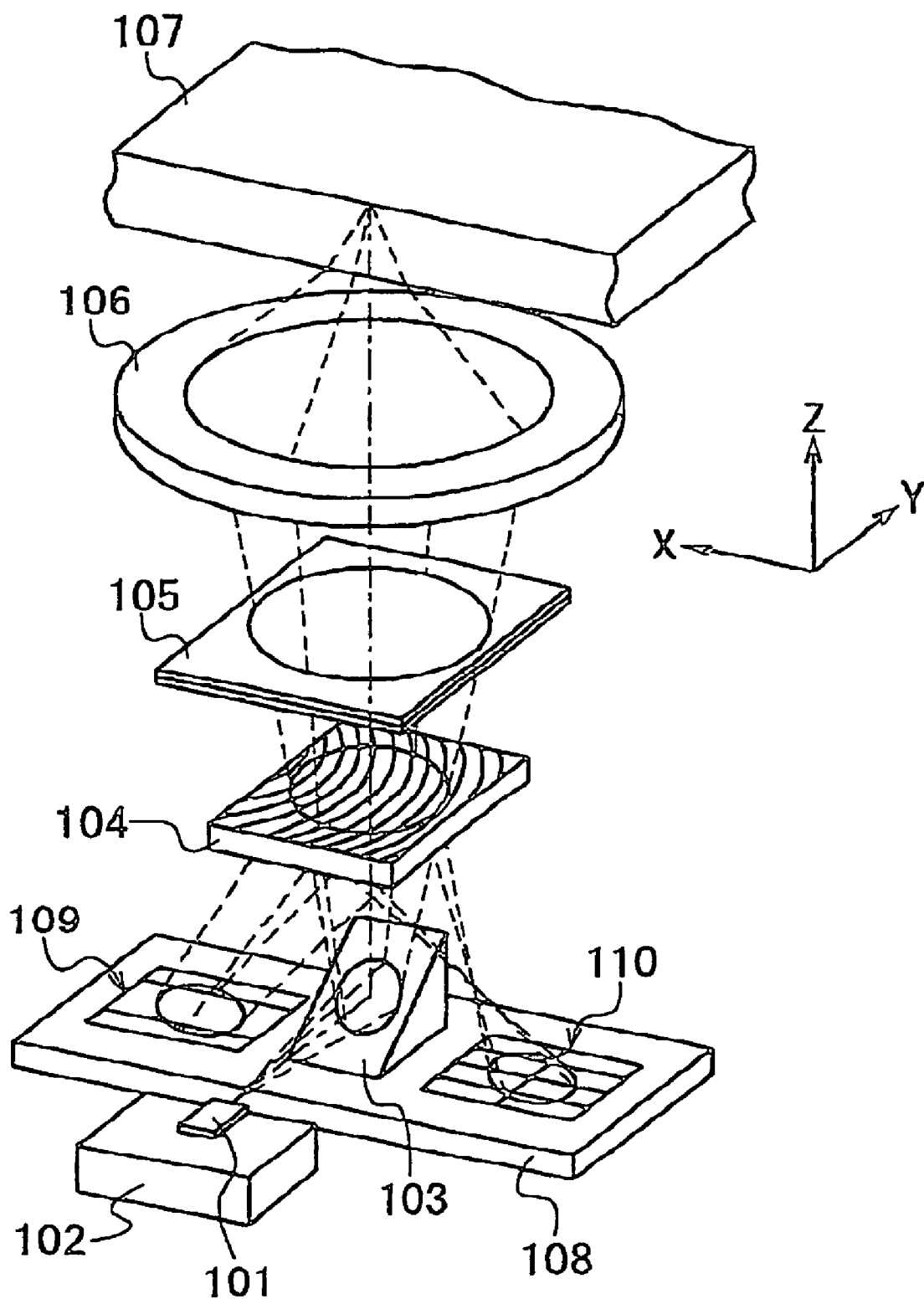
FIG. 1 is a schematic perspective view showing the optical system of a prior-art optical head.
Figure 2A:
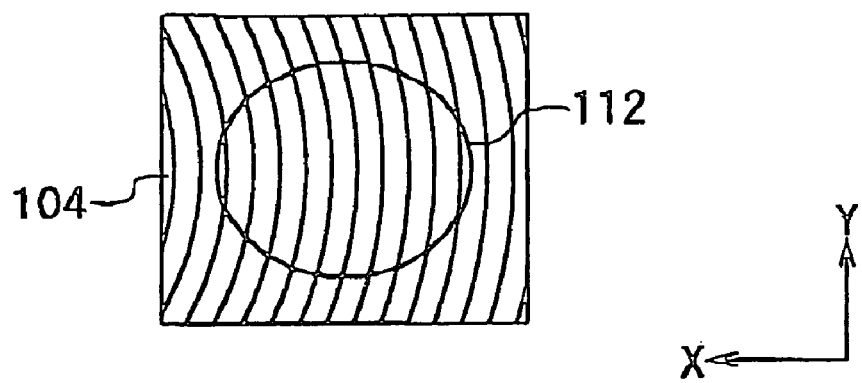
FIG. 2A is a schematic plan view showing the hologram element used in the prior-art optical head of FIG. 1.
Figure 2B:
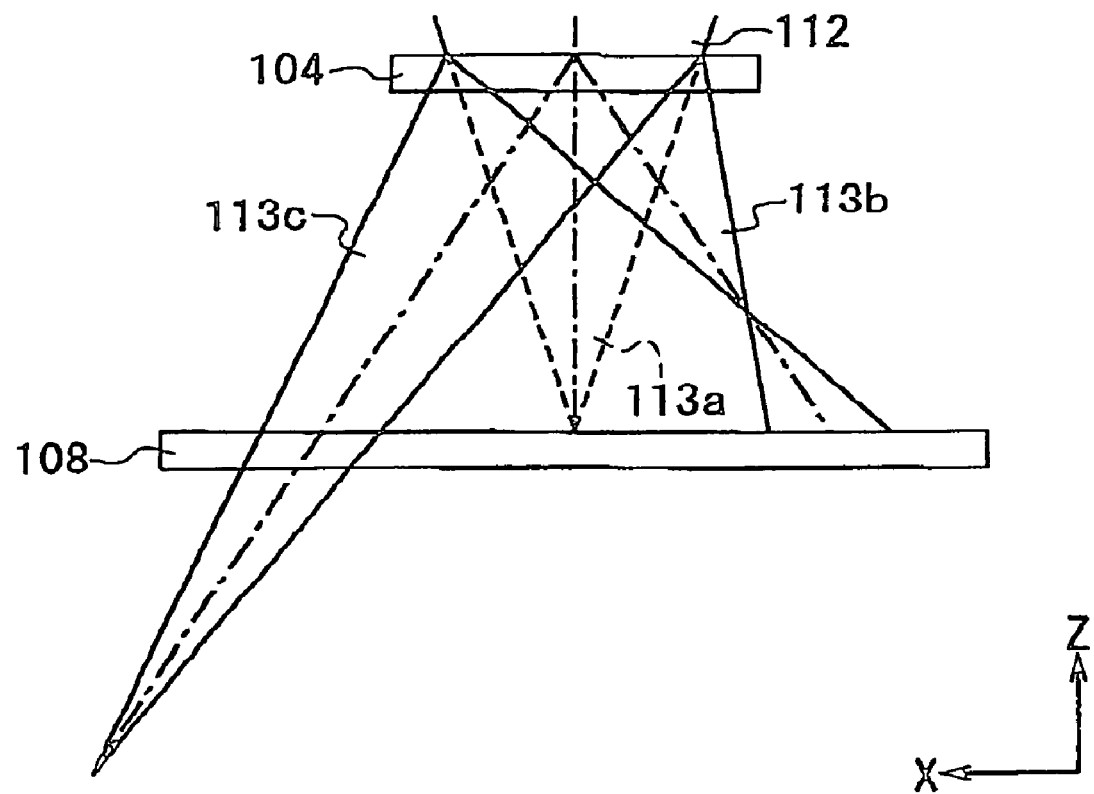
FIG. 2B is a schematic side view showing the state of the light beams between the hologram element and the optical detector in the prior-art optical head of FIG. 1.
Figure 3A:
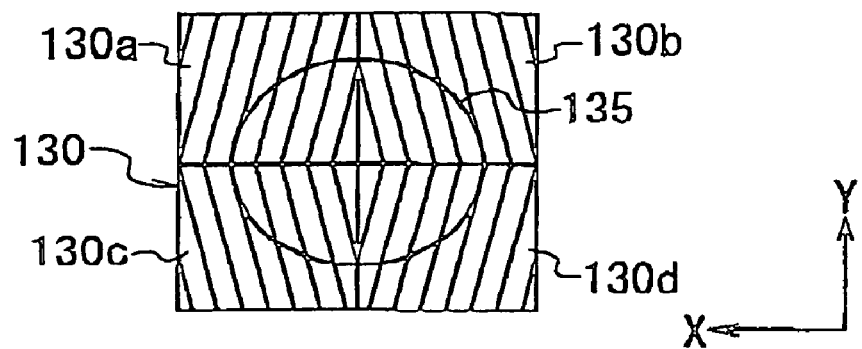
FIG. 3A is a schematic plan view showing the hologram element used in another prior-art optical head.
Figure 3B:
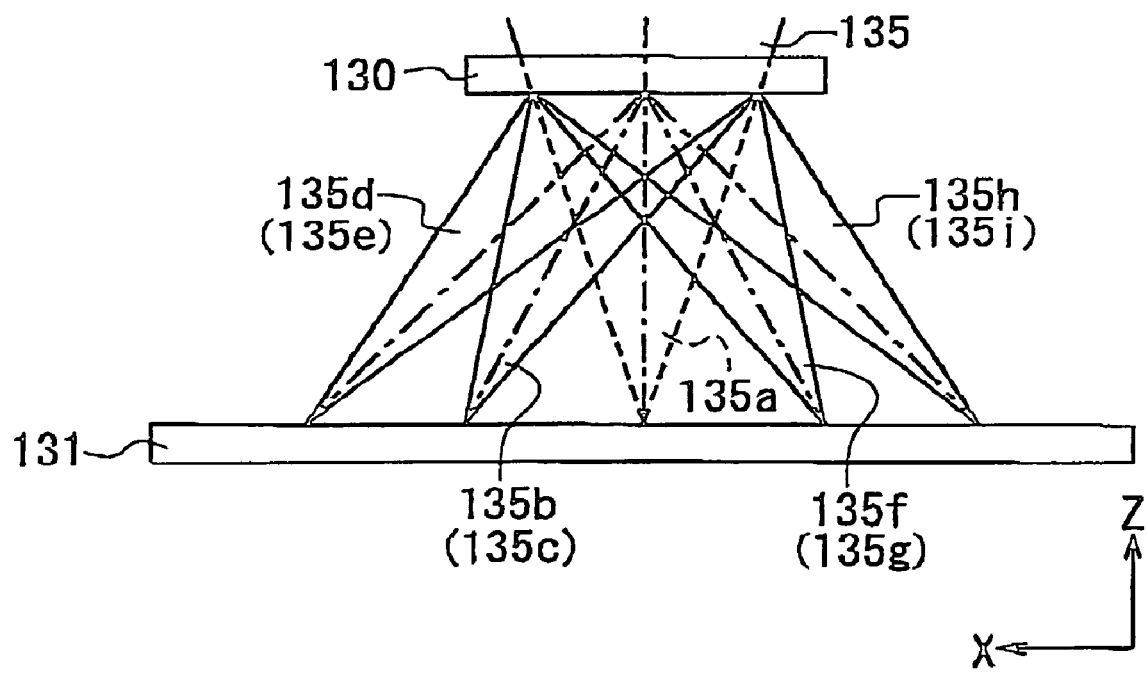
FIG. 3B is a schematic side view showing the state of the light beams between the hologram element and the optical detector in the prior-art optical head of FIG. 3A.

Preferred embodiments of the present invention will be described in detail below while referring to the drawings attached First Embodiment An optical head according to a first embodiment of the present invention is shown in FIGS. 4 and 5A to 5C, in which X and Y denote the radial and tangential directions of concentric or spiral tracks of a disk-shaped recording medium, respectively, and Z denotes the longitudinal axis of the optical system.

Figure 4:
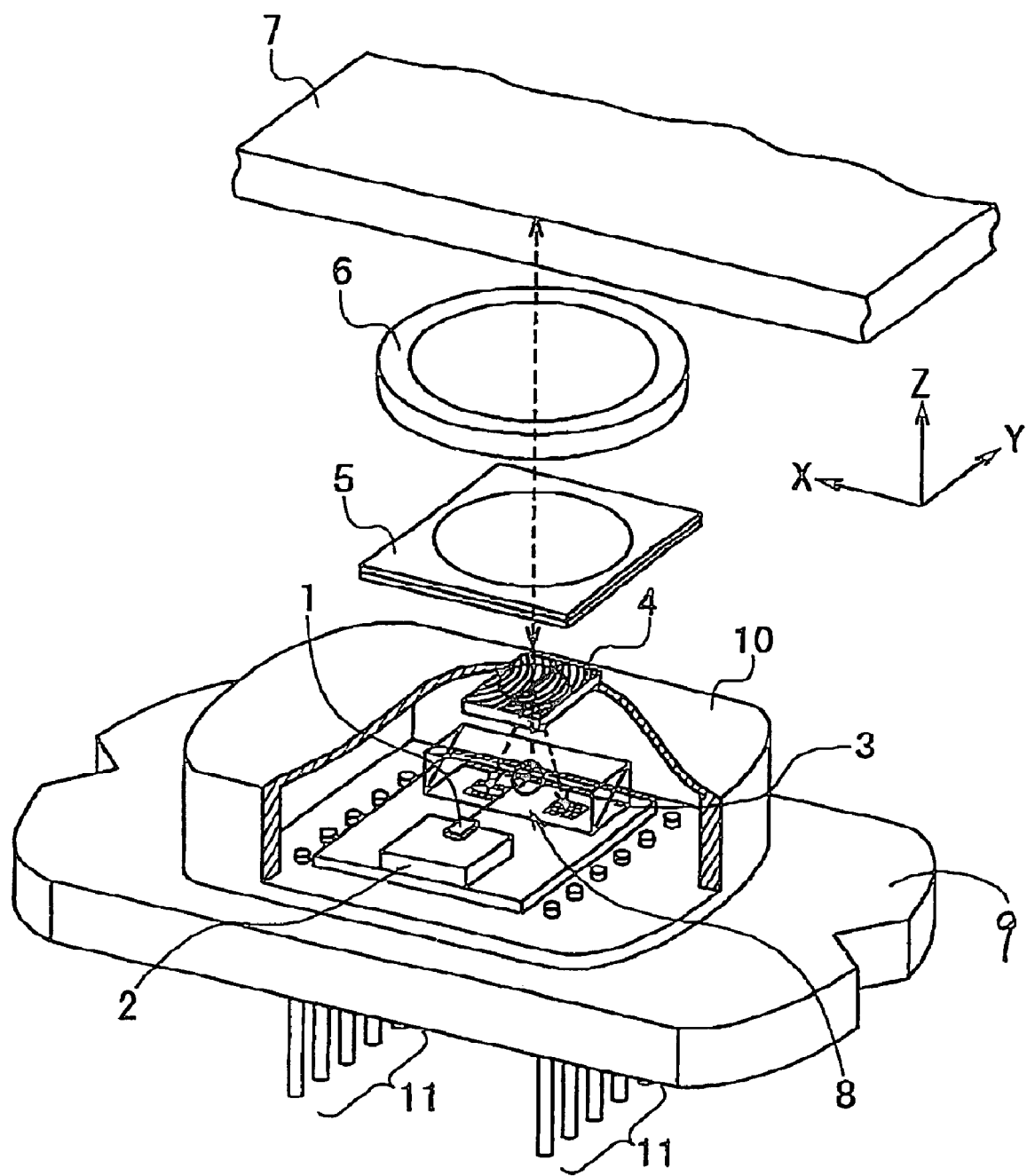
FIG. 4 is a schematic, partial perspective view showing the configuration of an optical head according to a first embodiment of the present invention, in which the cap is partially cut away to show the inside structure of the cap.

As shown in FIG. 4, the head comprises a laser diode 1 mounted on a heat sink 2, a prism 3, a polarizing hologram element 4, a quarter-wave plate 5, an objective lens 6, an optical detector 8, a metallic stem 9, and a cap 10. The laser diode 1, the heat sink 2, and the prism 3 are bonded onto the stem 9. The cap 10 has a transparent window on its top surface. The hologram element 4 is adhered to the top surface of the cap 10 to overlap the window, allowing the light beam to enter the inside the cap 10 and to emit therefrom. The stem 9 and the cap 10 are joined together to seal an inert gas in the inner space formed by the stem 9 and the cap 10 thus joined. The quarter-wave plate 5 and the objective lens 6 are arranged outside the cap 10 to be located on the optical axis of the head.

The stem 9 has leads 11 protruding downward at its bottom surface. These leads 11 are electrically connected to the corresponding terminals of the optical detectors 8. The electric signals produced by the detector 8 are taken out of the optical head by way of the leads 11.

A linearly polarized light beam (i.e., an incident light beam), which is emitted from the laser diode 1 mounted on the heat sink 2, is reflected by the prism 3 and then, enters the polarizing hologram element 4. The reason that the incident light beam is linearly polarized is to prevent it from diffracting by the element 4. The incident light beam emitted by the laser diode 1 passes through the element 4 without diffraction at this time and then, it is converted to a circularly polarized light beam by a quarter-wave plate 5. The circularly polarized light beam thus generated is then focused so as to form a spot on the surface of a disk-shaped recording medium 7. The medium 7 is rotating around a specific axis in the vicinity of the objective lens 6 of the head.

The circularly polarized light beam is reflected by the surface of the medium 7, at which the beam absorbs a piece of information recorded in the specific area of the medium 7 corresponding to the spot. The circularly polarized light beam thus reflected passes through the objective lens 6 and is converted to a linearly polarized light beam by the quarter-wave plate 5. The linearly polarized light beam thus generated is diffracted by the hologram element 4, generating not only a reproduction or playback signal beam but also two focusing error signal beams and two tracking error signal beams. The focusing error signal beams thus generated are received by a focusing error signal receiver 14 formed on the optical detector 8. The tracking error signal beams thus generated are received by a tracking error signal receiver 15 formed on the detector 8.

The polarizing hologram element 4 is a concentric phase-type diffraction grating made by forming a proton exchange region in a proper crystal such as a $LiNbO_3$ crystal. The refractive index of the element 4 varies according to the polarization direction of the light beam received. If a ray of the beam passing through the proton exchange region and a ray of the beam passing through the non-proton exchange region are different in phase to thereby generate a zero-order diffracted light beam and as a result, the diffraction efficiency to the ±1st-order diffracted light beams is lowered, it is preferred that the proton exchange region is coated by a non-polarizing thin film such as magnesium fluoride ($MgF_2$), silicon dioxide ($SiO_2$), or titanium dioxide ($TiO_2$) by evaporation to compensate the phase difference.

Also, theoretically, the zero-order diffracted light beam can be completely prevented from occurring if the proton exchange region is formed by a protruding part of the diffraction grating and the non-proton exchange region is formed by a depressing part thereof with an equal width to the protruding part while the protruding and depressing parts of the grating generate a phase difference of $\pi$.

Figure 5A:
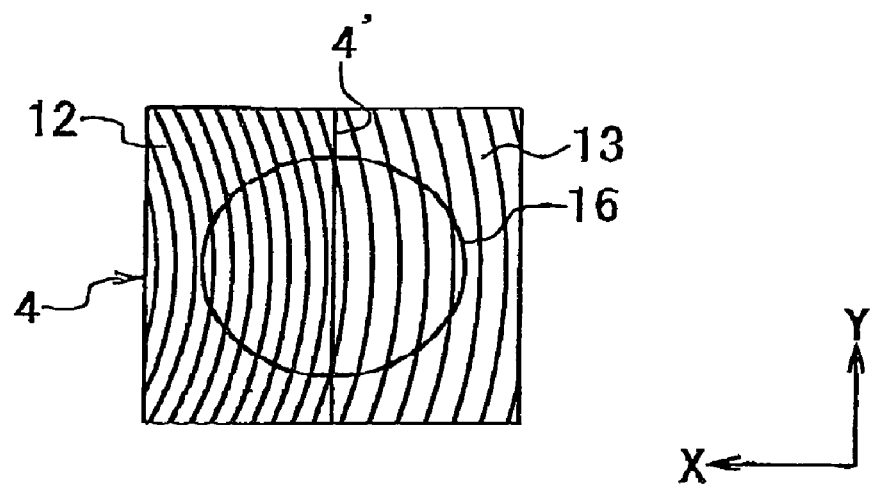
FIG. 5A is a schematic plan view showing the hologram element used in the optical head according to the first embodiment of FIG. 4.
Figure 5B:
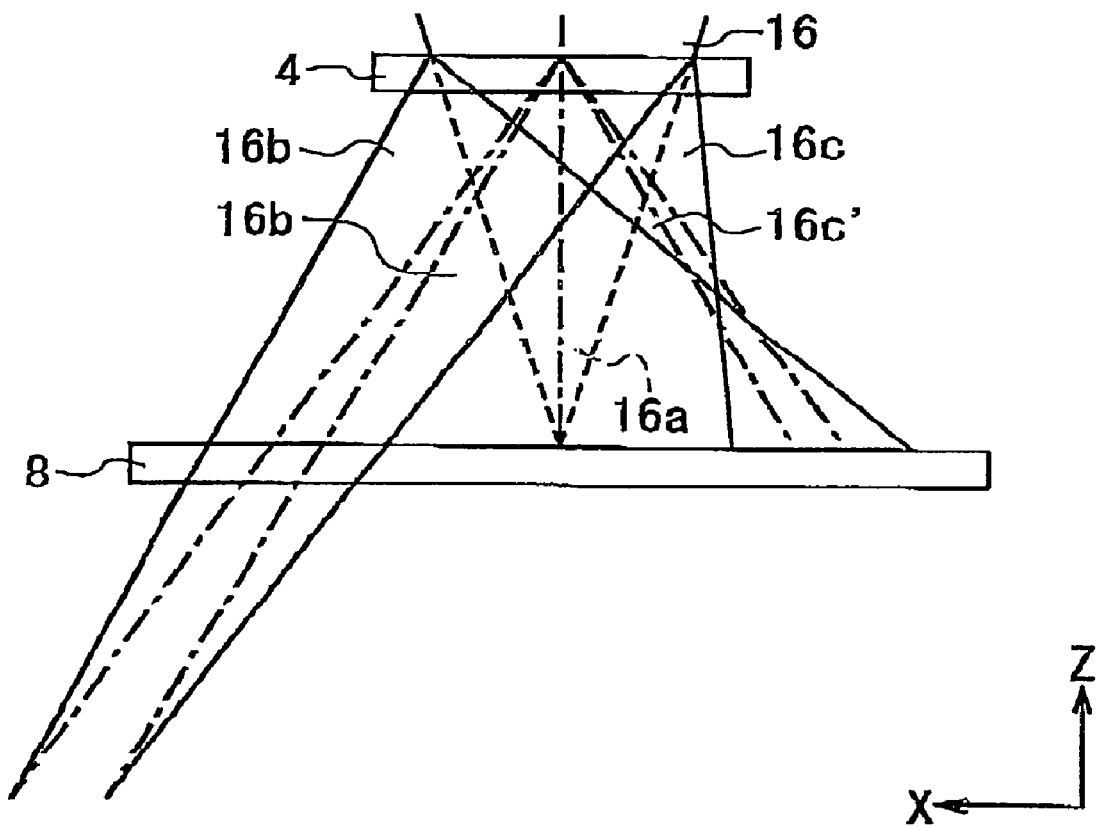
FIG. 5B is a schematic side view showing the state of the light beams between the hologram element and the optical detector in the optical head according to the first embodiment of FIG. 4.

As shown in FIG. 5A, the hologram element 4 has two rectangular regions 12 and 13 defined by a straight division line 5 extending along the Y direction (i.e., the tangential direction of the recording tracks of the medium 7). These regions 12 and 13 have arc-shaped gratings whose centers are offset to each other. The element 4 produces a zero-order diffracted light beam 16a, two +1st-order diffracted light beams 16b and 16b' focusing forward with respect to the zero-order diffracted light beam, and two −1st-order diffracted light beams 16c and 16c' focusing backward with respect to the zero-order diffracted light beam, as shown in FIG. 5B.

Figure 5C:
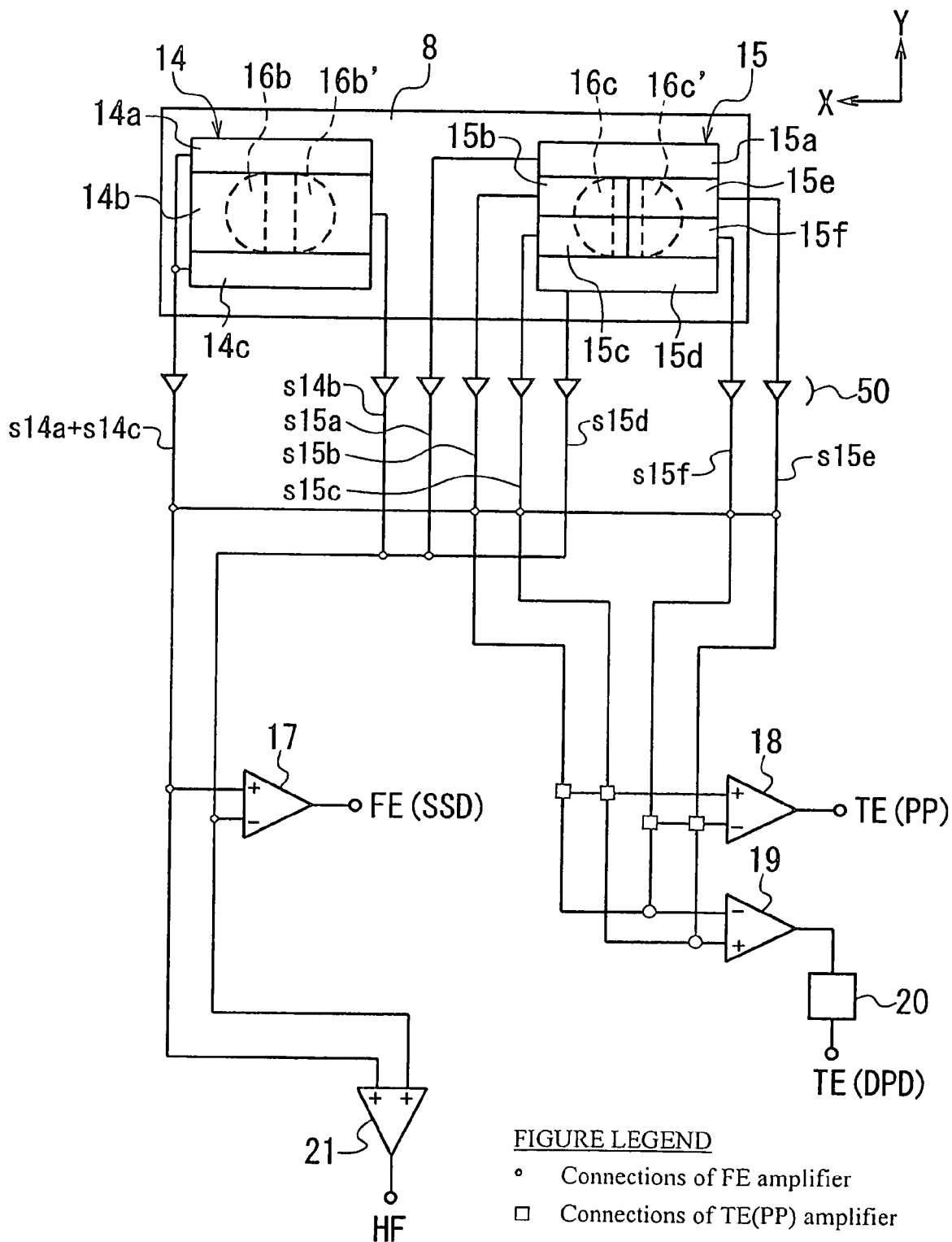
FIG. 5C is a schematic plan view showing the signal generation and processing of the optical detector in the optical head according to the first embodiment of FIG. 4.

As shown in FIG. 5C, the optical detector 8 has a focusing error signal receiver 14 and a tracking error signal receiver 15. The focusing error signal receiver 14 has two division lines perpendicular to the direction corresponding to the division line 4' of the hologram element 4, forming three rectangular beam receiving regions (i.e., light receiving elements) 14a, 14b, and 14c. The tracking error signal receiver 15 has three division lines perpendicular to the direction corresponding to the division line 4' of the hologram element 4 and two division lines parallel to the same direction, forming six rectangular beam receiving regions (i.e., light receiving elements) 15a, 15b, 15c, 15d, 15e, and 15f. Thus, the detector 8 has nine beam receiving regions (i.e., light receiving elements) in total.

Next, the method of detecting the focusing error, tracking error, and reproduction or playback signal beams is explained below with reference to FIGS. 5A to 5c.

When a reflected light beam 16 by the recording medium 7 passes through the hologram element 4, the zero-order diffracted beam 16a is generated. At the same time, the +1st-order diffracted beams 16b and 16b' are generated by the hologram regions 12 and 13 of the element 4, respectively. The −1st-order diffracted beams 16c and 16c' are generated by the hologram regions 12 and 13 thereof, respectively. A shown in FIG. 5C, each of the +1st-order diffracted beam 16b and 16b' forms a sector-shaped spot on the surface of the focusing error signal receiver 14 of the optical detector 8 having the three beam receiving regions (i.e., light receiving elements) 14a, 14b, and 14c. Each of the −1st-order diffracted beams 16c and 16c' forms a sector-shaped spot on the surface of the tracking error signal receiver 15 of the detector 8 having the six beam receiving regions (i.e., light receiving elements) 15a, 15b, 15c, 15d, 15e, and 15f.

The total beam receiving region of the focusing error signal receiver 14 is equal in size to that of the tracking error signal receiver 15.

The detector 8 is located on the optical axis Z of the head in such a way that the +1st-order diffracted beam 16b diffracted by the hologram regions 12 and the +1st-order diffracted beam 16b' diffracted by the hologram region 13 form sector-shaped beam spots with equal diameters on the surface of the focusing error signal beam receiver 14.

When the medium 7 moves to be apart from the optical head with respect to the focusing point of the objective lens 6, the diameter of the diffracted light beam 16b by the hologram region 12 decreases (i.e., the beam 16b converges) while the diameter of the diffracted light beam 16b' by the hologram region 13 increases (i.e., the beam 16b' expands). The diameter of the beam 16b is then minimized at the focal point and thereafter, is inverted to increase.

When the medium 7 approaches the optical head with respect to the focusing point of the objective lens 6 due to surface fluctuation of the medium 7, the diameter of the diffracted light beam 16b by the hologram region 12 increases (i.e., the beam 16b expands) while the diameter of the diffracted light beam 16b' by the hologram region 13 decreases (i.e., the beam 16b' converges). The diameter of the beam 16b' is then minimized at the focal point and thereafter, is inverted to increase.

Here, as shown in FIG. 5C, the output signals generated by the beam receiving regions 14a, 14b, and 14c of the focusing error signal receiver 14 and then, current-to-voltage converted and amplified by corresponding current-to-voltage conversion amplifiers 50 are respectively defined as s14a, s14b, and s14c. Similarly, the output signals generated by the beam receiving regions 15a, 15b, 15c, 15d, 15e, and 15f of the tracking error signal receiver 15 and then, current-to-voltage converted and amplified by corresponding current-to-voltage conversion amplifiers 50 are respectively defined as s15a, s15b, s15c, s15d, s15e, and s15f.

Then, the focusing error signal FE is produced by using the spot size detection (SSD) method in the following way.

A differential amplifier 17 is electrically connected to the beam receiving regions 14a, 14b, and 14c and the beam receiving regions 15a, 15b, 15c, 15d, 15e, and 15f, as shown in FIG. 5C. Therefore, the focusing error signal FE(SSD) is given by the following equation (9).

$$FE(SSD)=(s14a+s14c+s15b+s15c+s15e+s15f)-(s14b+s15a+s15d) \quad (9)$$

If the recording tracks of the medium 7 are deviated from their desired position due to eccentricity, the radial distribution of the optical strength on the medium 7 varies. Thus, the tracking error signal TE is given by the push-pull (PP) detection method in the following way.

A differential amplifier 19 is electrically connected to the beam receiving regions 15b, 15c, 15f, and 15g, as shown in FIG. 5C. Therefore, the tracking error signal TE(PP) is given by the following equation (10).

$$TE(PP)=(s15b+s15c)-(s15f+s15g) \quad (10)$$

The tracking error signal TE may be obtained by the differential phase detection (DPD) method preferably applied to the DVDs, in which a differential amplifier 19 and a differential phase detection circuit 20 are used, as shown in FIG. 5C. In this case, the tracking error signal TE(DPD) is given by the following equation (11).

$$TE(DPD)=(s15c+s15e)-(s15b+s15f) \quad (11)$$

By using a summing amplifier 21, the information playback signal HF is given by the following equation (12).

$$HF=s14a+s14b+s14c+s15a+s15b+s15c+s15d+s15e+s15f \quad (12)$$

With the optical head according to the first embodiment, the hologram element 4 generates the diffracted light beams 16b and 16b' for focusing error detection and the diffracted light beams 16c and 16c' for tracking error detection from the reflected light 16 generated by reflection of the incident light beam on the optical recording medium 7. The optical detector 8 detects the diffracted light beams 16b and 16b' for focusing error detection at the receiving surface 14 and the diffracted light beams 16c and 16c' for tracking error detection at the receiving surface 15. Each of the receiving surfaces 14 and 15 is divided into receiving regions 14a to 14c and 15a to 15f, respectively. The at diffracted light beams 16b and 16b' for focusing error detection are received at the regions 14a to 14c and the diffracted light beams 16c and 16c' for tracking error detection are received at the regions 15a to 15f.

Moreover, since the diffracted light beams 16b and 16b' for tracking error detection are realized by forming the diffraction gratings 12 and 13 on the hologram element 4, the equivalent size of the beam used for tracking error detection can be increased. This means that the allowable positioning margin of the optical components is increased, relaxing the relative positional relationship between the package and the other optical elements.

Also, the hologram element 4 generates the diffracted light beams 16b and 16b' for focusing error detection and the diffracted light beams 16c and 16c' for tracking error detection from the reflected light beam 16. These diffracted light beams 16b and 16b' and 16c and 16c', are received by the receiving surfaces 14 and 15 of the optical detector 8, respectively. Thus, desired focusing and tracking error detection can be achieved even if the count of the light receiving regions of each of the receiving surfaces 14 and 15 is not increased as shown in the first and second prior-art optical heads. As a result, the signal processing circuits can be simplified to suppress possible noise generation, thereby eliminating the quality degradation of focusing and tracking error detection signals. The quality degradation of the focusing and tracking error detection signals may be raised.

Second Embodiment

Figure 6:
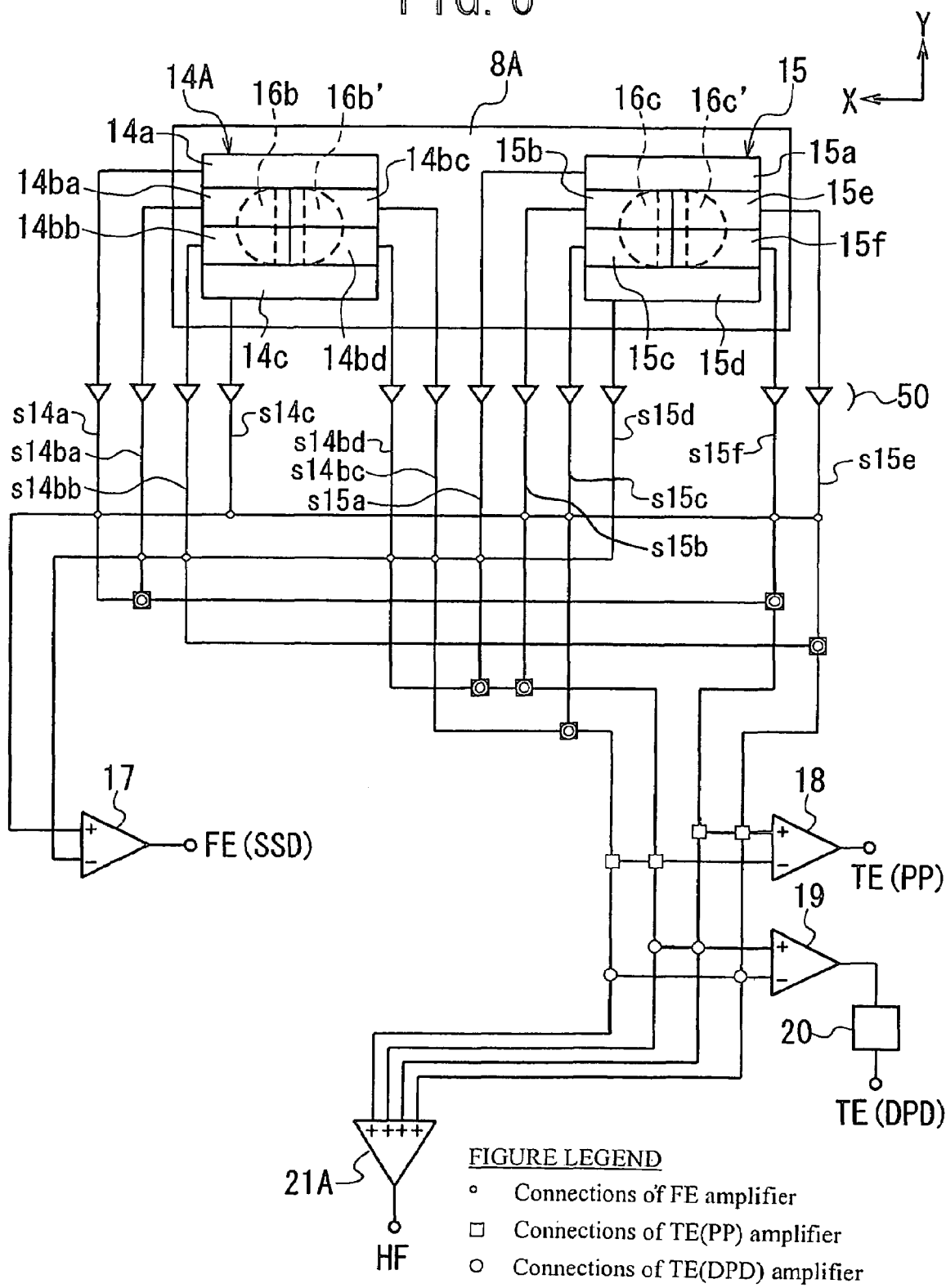
FIG. 6 is a schematic plan view showing the signal generation and processing of the optical detector in an optical head according to a second embodiment of the invention.

FIG. 6 shows the signal processing circuit of an optical head according to a second embodiment of the present invention, which has the same configuration as that of the head according to the first embodiment except that an optical detector 8A is used instead of the optical detector 8. Therefore, the explanation about the same configuration is omitted here for the sake of simplification of description by attaching the same reference numerals in FIG. 5C to the same elements in FIG. 6.

The optical detector 8A has a focusing error signal receiver 14A and the same tracking error signal receiver 15 as used in the first embodiment. The focusing error signal receiver 14a has three division lines perpendicular to the direction corresponding to the division line 5 of the hologram element 4 and a division line parallel to the line corresponding to the division line 5, forming six rectangular beam receiving regions (i.e., light receiving elements) 14a, 14ba, 14bb, 14bc, 14bd, and 14c. The regions 14ba, 14bb, 14bc, and 14bd are formed by dividing the region 14b in the first embodiment of FIG. 5C into four parts. Thus, the detector 8A has ten beam receiving regions (i.e., light receiving elements) in total.

Here, as shown in FIG. 6, the output signals generated by the beam receiving regions 14a, 14ba, 14bb, 14bc, and 14bd, and 1c of the focusing error signal receiver 14A and then, current-to-voltage converted and amplified by corresponding current-to-voltage conversion amplifiers 50 are respectively defined as s14a, s14ba, s14bb, s14bc, s14bd, and s14c. Similarly, the output signals generated by the beam receiving regions 15a, 15b, 15c, 15d, 15e, and 15f of the tracking error signal receiver 15 and then, current-to-voltage converted and amplified by corresponding current-to-voltage conversion amplifiers 50 are respectively defined as s15a, s15b, s15c, s15d, s15e, and s15f.

Then, the focusing error signal FE is produced by using the spot size detection (SSD) method in the following way.

A differential amplifier 17 is electrically connected to the beam receiving regions 14a, 14ba, 14bb, 14bc, 14bd, and 14c and the beam receiving regions 15a, 15b, 15c, 15d, 15e, and 15, as shown in FIG. 6. Therefore, the focusing error signal FE(SSD) is given by the following equation (13).

$$FE(SSD)=(s14a+s14c+s15b+s15c+s15e+s15f)-(s14ba+s14bb+s14bc+s14bd+s15a+s15d) \quad (13)$$

The tracking error signal TE is given by the push-pull (PP) detection method, i.e., TE(PP), is given by the following equation (14)

$$TE(PP)=(s15a+s15s+s14bc+s14bd)-(s15f+s15g+s14ba+s14bb) \quad (14)$$

The tracking error signal TE by the differential phase detection (DPD) method, i.e., TE(DPD), is given by the following equation (15)

$$TE(DPD)=(s15c+s15e+s14ba+s14bd)-(s15b+s15f+s14bb+s14bc) \quad (15)$$

By using a summing amplifier 21A, the information playback signal HF is given by the following equation (16).

$$HF=s14a+s14ba+s14bb+s14bc+s14bd+s14c+s15a+s15b+s15c+s15d+s15e+s15f \quad (16)$$

Third Embodiment

Figure 7:
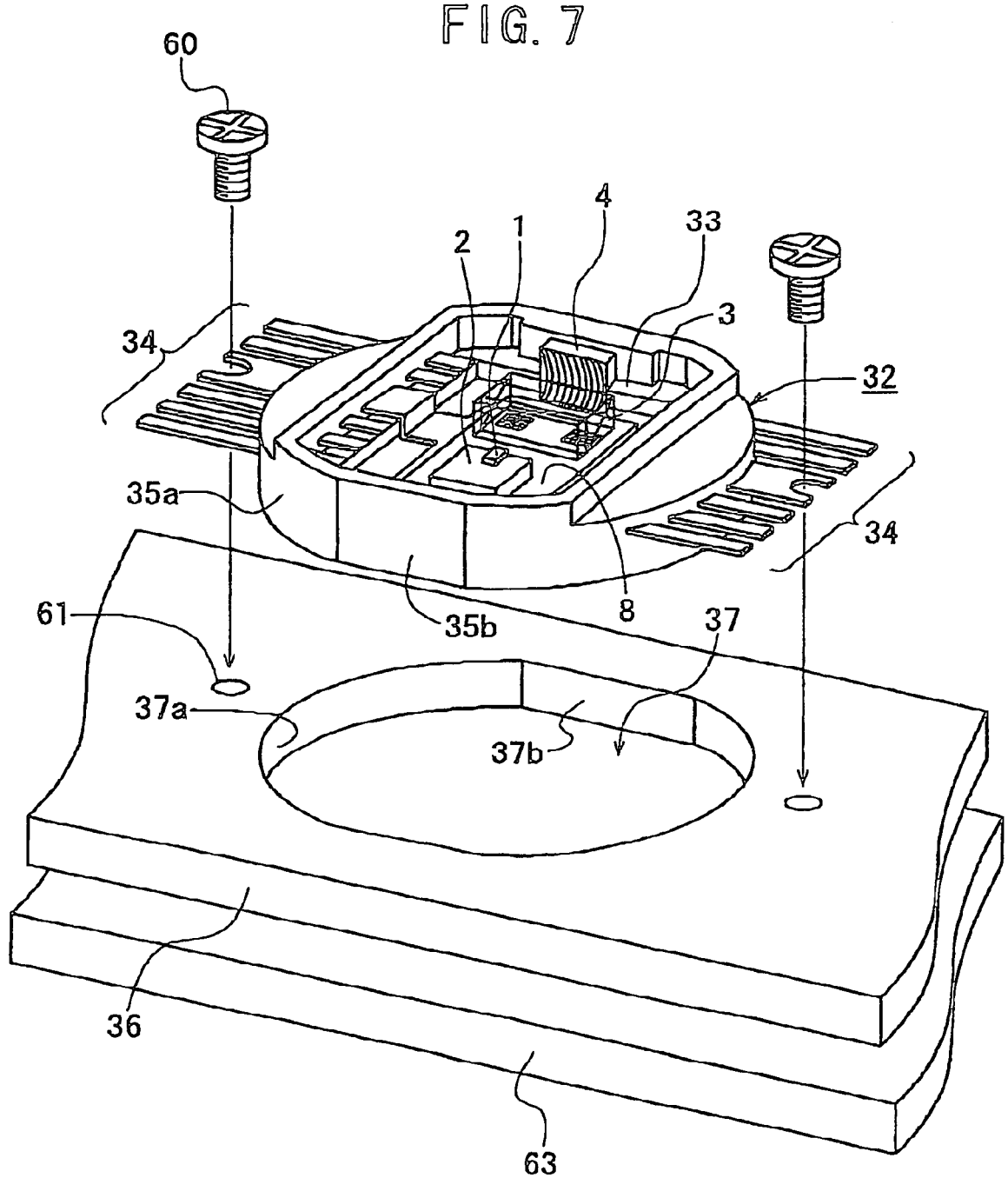
FIG. 7 is a schematic, partial perspective view showing the configuration of an optical head according to a third embodiment of the present invention, in which the lid of the package is removed to show the inside structure of the cap.

FIG. 7 shows an optical head equipped with a plastic package according to a third embodiment of the present invention, which has substantially the same configuration as that of the head according to the first embodiment except that the laser diode 1, the heat sink 2 on which the diode 1 is mounted, the prism or mirror 3, the polarizing hologram element 4, and the optical detector 8 are fixed to the inner bottom surface of a plastic package 32. The hologram element 4 is fixed to the mounting portion 33 of the package 32. The package 32 is formed by molding a proper plastic material. Leads 34 are formed to extend laterally from each side of the package 32 to derive the output signals from the detector 8. The leads 34 are integrated with the package 32.

With the optical head according to the third embodiment of the invention, the necessary optical elements such as the laser diode 1, the prism 3, the hologram element 4, and the detector 8 are built in the plastic package 32. Therefore, in addition to the advantages given in the above-described first and second embodiments, there is an additional advantage that the optical head configuration is simplified, the count of adjustment-required parts is reduced, and the optical head is downsized easily.

As shown in FIG. 7, the outer wall of the package 32 has a cylindrical surface 35a chamfered by two flat surfaces 35b. The flat surfaces 35b are parallel to the longitudinal axis of the cylindrical surface 35a (i.e., the package 32) and located at opposite positions with respect to the axis.

The plastic package 32 including the necessary optical components 1, 3, 4, and 8 is fixed to a plate-shaped optical head base 36 by inserting the package 32 into a hole 37 of the base 36 and securing the package 32 to the base 36 by tightening two screws 60 into corresponding holes 61 of the base 36. At this stage, the cylindrical and flat surfaces 35a and 35b of the package 32 are engaged with a cylindrical inner surface 37a and two flat surfaces 37b of the hole 37. Thus, the package 32 is fixed to the base 36 at a desired position. A proper heat dissipation plate 62 is attached to the bottom of the package 32.

As a result, there is an additional advantage that the operation to align the optical axis of the package 32 (i.e., the optical components 1, 3, 4, and 8) with that of the other components such as the quarter-wave plate 5 and the objective lens 6 is unnecessary or minimized. Moreover, there is a further additional advantage that heat dissipation is efficiently accomplished due to existence of the heat dissipation plate 63 even if the head includes the low-cost plastic package 32.

Fourth Embodiment

Figure 8A:
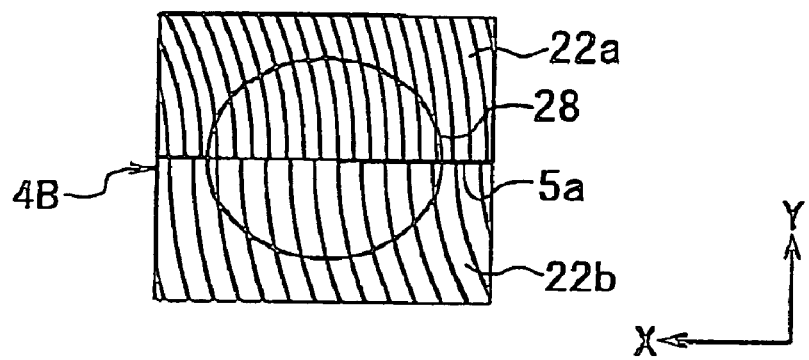
FIG. 8A is a schematic plan view showing the hologram element used in the optical head according to a fourth embodiment of the invention.
Figure 8B:
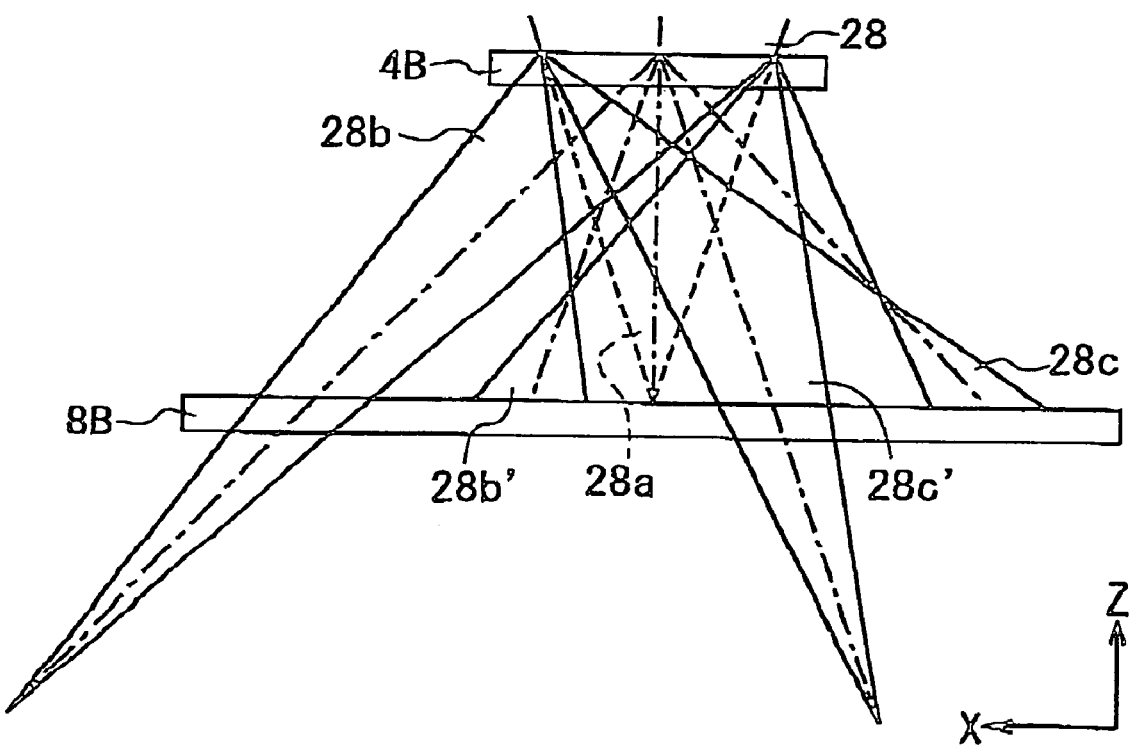
FIG. 8B is a schematic side view showing the state of the light beams between the hologram element and the optical detector in the optical head according to the fourth embodiment of FIG. 8A.

FIGS. 8A to 8C show the signal processing circuit of an optical head according to a fourth embodiment of the present invention, which has the same configuration as that of the head according to the first embodiment except that an optical detector 8B is used instead of the optical detector 8. Therefore, the explanation about the same configuration is omitted here for the sake of simplification of description by attaching the same reference numerals in FIGS. 5A to 5C to the same elements in FIGS. 8A to 8C.

AS shown in FIG. 8A, a polarizing hologram element 4B has two rectangular regions 22a and 22b, which are defined by a division line 5a extending along the X direction (i.e., the radial direction of the recording tracks of the medium 7). The regions 22a and 22b form arc-shaped gratings whose centers are offset. The element dB produces a zero-order diffracted light beam 28a, two +1st-order diffracted light beams 28b and 28b', and two −1st-order diffracted light beams 29c and 28c'.

An optical detector BB has a focusing error signal receiver 29 and a tracking error signal receiver 30. The focusing error signal receiver 29 has two division lines parallel to the direction corresponding to the division line 5a of the hologram element 4B, forming four rectangular beam receiving regions (i.e., light receiving elements) 29a, 29b, 29c, and 29d. The two regions 29a and 29b form a beam receiving surface 29A and the two regions 29c and 29d for another beam receiving surface 29B. The tracking error signal receiver 30 has two division lines perpendicular to the direction corresponding to the division line 5a of the hologram element 4B, forming four rectangular beam receiving regions (i.e., light receiving elements) 30a, 30b, 30c, and 30d. The two regions 30a and 30b form a beam surface 30A and the two regions 30c and 30d for another beam receiving surface 30B. Thus, the detector 8B has eight beam receiving regions (i.e. light receiving elements) in total.

When a reflected light beam 28 by the recording medium 7 passes through the hologram element 4B, the zero-order diffracted beam 28a is generated and at the same time, the +let-order diffracted beams 29b and 28b' are generated by the hologram region 22a of hologram element 4B and the −1st-order diffracted beams 28c and 28c' are generated by the hologram region 22b thereof. The +1st-order diffracted beams 28e and 28b form two sector-shaped spots on the surfaces 29A and 29B of the focusing error signal receiver 29 having the four beam receiving regions (i.e., light receiving elements) 29a, 29b, 29c, and 29d. The −1st-order diffracted beams 28c and 28c' form two sector-shaped spots on the surfaces 30A and 30B of the tracking error signal receiver 30 having the four beam receiving regions (i.e., light receiving elements) 28a, 28b, 28c, and 28d.

The detector BB is located on the optical axis Z of the head in such a way that the +1st-order diffracted beams 29a and 28a' diffracted by the hologram region 22a form the sector-shaped beam spots with equal diameters on the surface of the focusing error signal beam receiver 29A.

When the medium 7 moves to be apart from the optical head with respect to the focusing point of the objective lens 6, the diameter of the diffracted light beam 28b by the hologram region 22a decreases (i.e., the beam 28b converges) while the diameter of the diffracted light beam 28b' by the hologram region 22b increases (i.e., the beam 28b' expands). The diameter of the beam 28b is then minimized at the focal point and thereafter, is inverted to increase.

When the medium 7 approaches the optical head with respect to the focusing point of the objective lens 6 due to surface fluctuation of the medium 7, the diameter of the diffracted light beam 28b by the hologram region 22a increases (i.e., the beam 28b expands) while the diameter of the diffracted light beam 28b' by the hologram region 22b decreases (i.e., the beam 28b' converges). The diameter of the beam 28b' is then minimized at the focal point and thereafter, is inverted to increase.

Here, as shown in FIG. 5C, the output signals generated by the beam receiving regions 29a, 29b, 29c, and 29d of the focusing error signal receiver 29 and then, current-to-voltage converted and amplified by corresponding current-to-voltage conversion amplifiers 50 are respectively defined as s29a, s29b, s29c, and s29d Similarly, the output signals generated by the beam receiving regions 30a, 30b, 30c, and 30d of the tracking error signal receiver 30 and then, current-to-voltage converted and amplified by corresponding current-to-voltage conversion amplifiers 50 are respectively defined as s30a, s30b, s30c, and s30d.

Then, the focusing error signal FE is produced by using the spot size detection (SSD) method in the following way.

A differential amplifier 17 is electrically connected to the beam receiving regions 29a, 29b, 29c, and 29d, as shown in FIG. 8c. Therefore, the focusing error signal FE(SSD) is given by the following equation (17).

$$FE(SSD)=(s29a+s29d)-(s29b+s29c) \quad (17)$$

If the recording tracks of the medium 7 are deviated from their desired position due to eccentricity, the radial distribution of the optical strength on the medium 7 varies. Thus, the tracking error signal TE is given by the push-pull (PP) detection method in the following way.

A differential amplifier 18 is electrically connected to the beam receiving regions 30a, 30b, 30c, and 30d, as shown in FIG. 8C. Therefore, the tracking error signal TE(PP) is given by the following equation (18).

$$TE(PP)=(s30b+s30c)-(s30a+s30d) \quad (18)$$

The tracking error signal TE may be obtained by the differential phase detection (DPD) method preferably applied to the DVDs, in which a differential amplifier 19 and a differential phase detection circuit 20 are used. In this case, the tracking error signal TE(DPD) is given by the following equation (19).

$$TE(DPD)=(s30a+s30c)-(s30b+s30d) \quad (19)$$

By using a summing amplifier 125, the information playback signal HF is given by the following equation (20).

$$HF=s29a+s29b+s29c+s29d+s30a+s30b+s30c+s30d \quad (20)$$

With the head according to the fourth embodiment, each of the focusing and trucking error signal receivers 29 and 30 can be realized by a photodiode having four light receiving regions (i.e., a four-divided photodiode). Therefore, there is an additional advantage that the count of the light receiving elements on the detector can be minimized, thereby suppressing the quality degradation of the reproduction signals due to noises.

Fifth Embodiment

FIGS. 9A to 9D show the signal processing circuit of an optical head according to a fifth embodiment of the present invention, which has the same configuration as that of the head according to the first embodiment except that a hologram element 4C and an optical detector 8C are used instead of the hologram element 4 and the optical detector 8, respectively.

Figure 9A:
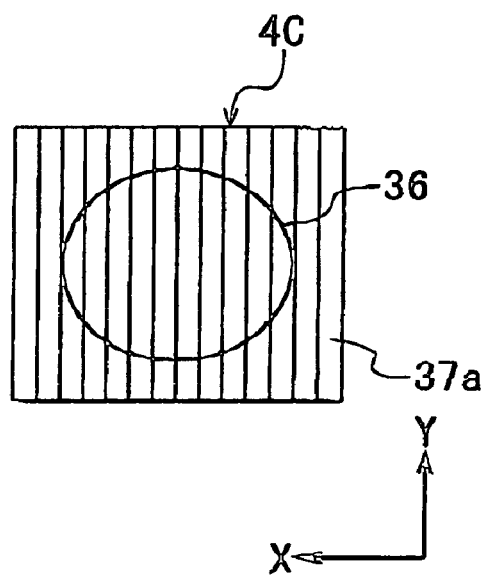
FIG. 9A is a schematic plan view showing the upper surface of the hologram element used in an optical head according to a fifth embodiment of the invention.
Figure 9B:
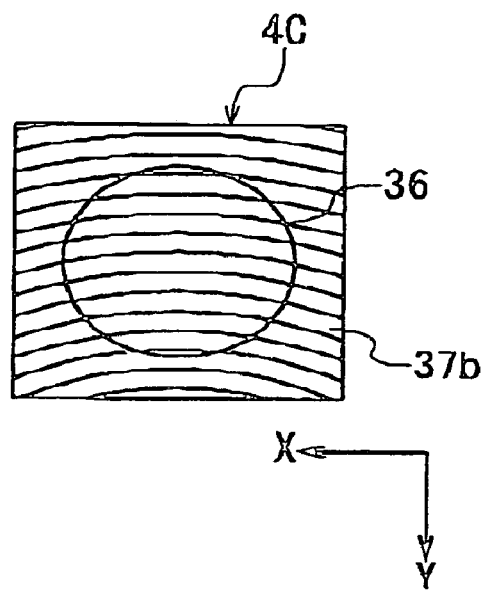
FIG. 9B is a schematic plan view showing the lower surface of the hologram element used in an optical head according to the fifth embodiment of the invention

The polarizing hologram element 4C has an upper diffraction grating 37a and a lower diffraction grating 37b. The upper grating 37a is formed on the upper surface of the element 4C. The lower diffraction grating 37b is formed on the lower surface of the element 4C. No division line is formed on the upper and lower surfaces of the element 4C. As shown in FIGS. 9A and 9B, the upper grating 37a is linear and the lower grating 37b is arc-shaped.

Figure 9C:
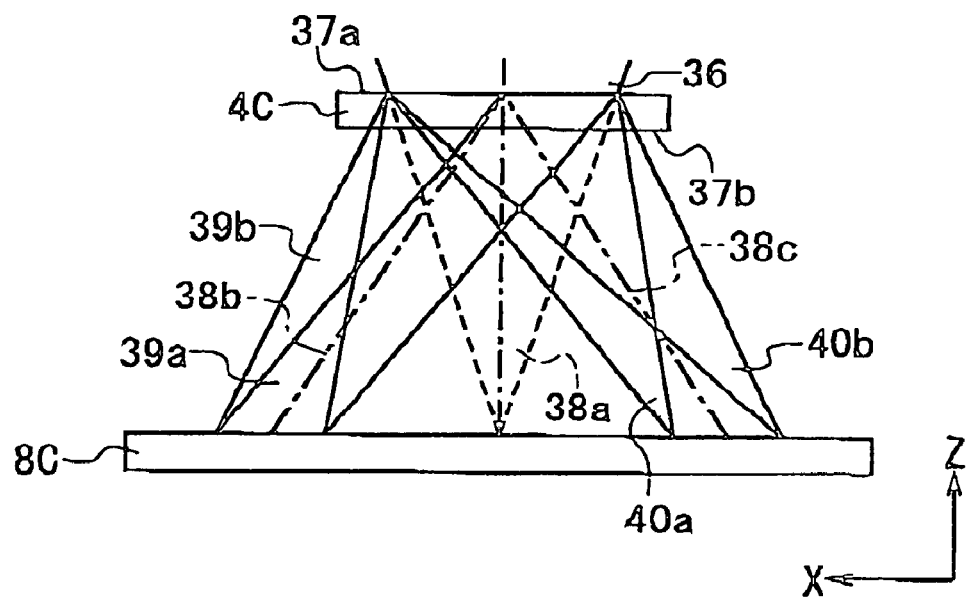
FIG. 9C is a schematic side view showing the state of the light beams between the hologram element and the optical detector in the optical head according to the fifth embodiment of the invention

As shown in FIG. 9C, the upper grating 37a produces a zero-order diffracted light beam 38a, a +1st-order diffracted light beam 38b, and a −1st-order diffracted light beam 38c from the reflected light beam 36. The lower grating 37b produces two +1st-order diffracted light beam 39a and 39b from the +1st-order diffracted light beam 38b, and at the same time, it produces two +1st-order diffracted light beam 40a and 40b from the −1st-order diffracted light beam 38c.

The optical detector 8C has a focusing error signal receiver 41 and a tracking error signal receiver 62. The focusing error signal receiver 41 has four division lines parallel to each other, forming six rectangular beam receiving regions (i.e., light receiving elements) 41a, 41b, 41c, 41d, 41e, and 41f. The three regions 41a, 41b, and 41c form a beam receiving surface 41A and the three regions 41d, 41e, and 41f form another beam receiving surface 41B. The tracking error signal receiver 62 has four division lines, two ones of which are parallel to the division lines of the focusing error signal receiver 41 and the remaining two ones of which are perpendicular to the same, thereby forming eight rectangular beam receiving regions (i.e., light receiving elements) 42a, 42b, 42c, 42d, 43a, 43b, 43c, and 43d. Thus, the detector 8C has 14 beam receiving regions (i.e., light receiving elements) in total.

When the reflected light beam 36 by the recording medium 7 passes through the hologram element 4C, the +1st-order diffracted beam 39a and 39b and the −1st-order diffracted beams 40a and 40b are generated by the element 4C. The +1st-order diffracted beams 39a and 39b form two circular spots on the focusing error signal receiver 41 having the four beam receiving regions (i.e., light receiving elements) 41a, 41b, 41c, 41d, 41e, and 41f. The beams 39a and 39b are located on the beam receiving surfaces 41A and 41B, respectively. The −1st-order diffracted beams 40a and 40b' form two circular spots on the tracking error signal receiver 62 having the eight beam receiving regions (i.e., light receiving elements) 42a, 42b, 42c, 42d, 42e, 42f, 42g, and 42h The beams 40a and 40b are located on the beam receiving surfaces 42 and 43, respectively.

The detector BC is located on the optical axis Z of the head in such a way that the +1st-order diffracted beams 39a and 39b diffracted by the hologram element 4c form the circular beam spots with equal diameters on the surface of the focusing error signal beam receiver 41.

When the medium 7 moves to be apart from the optical head with respect to the focusing point of the objective lens 6, the diameter of the diffracted light beam 39a by the hologram element 4C decreases (i.e., the beam 39a converges) while the diameter of the diffracted light beam 39b by the hologram element 4C increases (i.e., the beam 39b expands). The diameter of the beam 39a is then minimized at the focal point and thereafter, is inverted to increase.

When the medium 7 approaches the optical head with respect to the focusing point of the objective lens 6 due to surface fluctuation of the medium 7, the diameter of the diffracted light beam 39a increases (i.e., the beam 39a expands) while the diameter of the diffracted light beam 39b decreases (i.e., the beam 39b converges). The diameter of the beam 39b is then minimized at the focal point and thereafter, is inverted to increase.

Here, as shown in FIG. 9D, the output signals generated by the beam receiving regions 41a, 41b, 41c, 41d, 41e, and 41f of the focusing error signal receiver 41 and then, current-to-voltage converted and amplified by corresponding current-to-voltage conversion amplifiers 50 are respectively defined as s41a, s41b, s41c, s41d, s41e, and s41f. Similarly, the output signals generated by the beam receiving regions 42a, 42b, 42c, 42d, 43a 43b, 43c, and 42d of the tracking error signal receiver 62 and then, current-to-voltage converted and amplified by corresponding current-to-voltage conversion amplifiers 50 are respectively defined as s42a, s42b, s42c, s42d, s43a, s43b, s43c, and s43d.

Then, the focusing error signal FE is produced by using the spot size detection (SSD) method in the following way.

A differential amplifier 44 is electrically connected to the beam receiving regions 41a, 41b, 41c, 41d, 41e, and 41f, as shown in FIG. 9D. Therefore, the focusing error signal FE(SSD) is given by the following equation (21).

$$FE(SSD)=(s41a+s41c+s41e)-(s41b+s41d+s41f) \quad (21)$$

If the recording tracks of the medium 7 are deviated from their desired position due to eccentricity, the radial distribution or the optical strength on the medium 7 varies. Thus, the tracking error signal TE is given by the push-pull (PP) detection method in the following way.

A differential amplifier 45 is electrically connected to the beam receiving regions 42a, 42b, 42c, 42d, 43a 43b, 43c, and 43d, as shown in FIG. 9D. Therefore, the tracking error signal TE(PP) is given by the following equation (22).

$$TE(PP)=(s42a+s42b+s43c+s43d)-(s42c+s42d+s43a+s43b) \quad (22)$$

The tracking error signal TE may be obtained by the differential phase detection (DPD) method preferably applied to the DVDS, in which a differential amplifier 46 and a differential phase detection circuit 47 are used. In this case, the tracking error signal TE(DPD) is given by the following equation (23).

$$TE(DPD)=(s42a+s42c+s43b+s43c)-(s41b+s41d+s43a+s43d) \quad (23)$$

By using a summing amplifier 125, the information playback signal HF is given by the following equation (24).

$$HF=s41a+s41b+s41c+s41d+s41e+s41f+s42a+s42b+s42c+s42d+s43a+s43b+s43c+s43d \quad (24)$$

The above-explained optical heads according to the first to fifth embodiments of the invention may be applied to various optical recording media of the types such as the reproduction only type, write once type, and rewritable type.

In the above-explained embodiments, a finite-system objective lens is used as the objective lens 6. However, it is needless to say that any infinite-system objective lens such as a collimate lens may be used.

While the preferred forms of the present invention have been described, it is to be understood that modifications will be apparent to those skilled in the art without departing from the spirit of the invention. The scope of the present invention, therefore, is to be determined solely by the following claims.

The invention claimed is:

1. An optical head, comprising:
   (a) a light source for emitting a light beam to be irradiated to an optical recording medium as an incident light beam;

(b) a hologram element for receiving a reflected light beam generated by reflection of said incident light beam on said medium to generate at least two diffracted light beams for focusing error detection and at least two diffracted light beams for tracking error detection; and (c) an optical detector for detecting the at least two diffracted light beams for focusing error detection and the at least two diffracted light beams for tracking error detection;

said detector including a first receiving surface for receiving the at least two diffracted light beams for focusing error detection and a second receiving surface for receiving the at least two diffracted light beams for tracking error detection;

each of said first and second receiving surfaces being divided into receiving regions;

the at least two diffracted light beams for focusing error detection being received at said receiving regions of said first receiving surface;

the at least two diffracted light beams for tracking error detection being received at said receiving regions of said second receiving surface;

wherein said hologram element has diffraction gratings, said gratings having different grating patterns and at least one of said grating patterns being non-linear and having an offset center with respect to another of said grating patterns, and wherein the at least two diffracted light beams for focusing error detection and the at least two diffracted light beams for tracking error detection are generated by said gratings of said element, and wherein said hologram element has a property of selectively exhibiting a diffraction grating function according to a polarization direction of said reflected light beam, and wherein the hologram element has a refractive index that varies according to the polarization direction, and wherein said hologram element has a first diffraction grating on a surface of said element and a second diffraction grating on an opposite surface thereof.

2. The head according to claim 1, wherein at least said light source and said optical detector are located in a package having a positioning mechanism;

and wherein said package is mounted on a base using said positioning mechanism.

3. The head according to claim 2, wherein said base has a hole into which said package is inserted;

and wherein an inner wall of said hole is substantially equal in shape and size to an outer wall of said package;

and wherein said inner wall of said hole has an engaging part and said outer wall of said package has a corresponding engaging part;

and wherein said package is positioned at a desired location with respect to said base by engagement between said engaging parts of said hole and said package.

4. The head according to claim 3, further comprising a heat dissipation member for dissipating heat generated by said light source.

5. An optical head, comprising:

(a) a light source for emitting a light beam to be irradiated to an optical recording medium as an incident light beam;

(b) a hologram element including a first diffraction grating on a surface of said element and a second diffraction grating on an opposite surface thereof, said first and second gratings having different patterns, and wherein at least one of said patterns is non-linear and has an offset center with respect to the other diffraction grating pattern;

said element receiving a reflected light beam generated by reflection of said incident light beam on said medium, thereby generating at least two diffracted light beams for focusing error detection and at least two diffracted light beams for tracking error detection by using said first and second gratings;

(c) an optical detector for detecting the at least two diffracted light beams for focusing error detection and the at least two diffracted light beams for tracking error detection;

said detector including a first receiving surface for receiving the at least two diffracted light beams for focusing error detection and a second receiving surface for receiving the at least two diffracted light beams for tracking error detection;

each of said first and second receiving surfaces being divided into receiving regions;

the at least two diffracted light beams for focusing error detection being received at said receiving regions of said first receiving surface;

the at least two diffracted light beams for tracking error detection being received at said receiving regions of said second receiving surface;

wherein said hologram element has a property of selectively exhibiting a diffraction grating function according to a polarization direction of said reflected light beam, and wherein the hologram element has a refractive index that varies according to the polarization direction.

6. The head according to claim 5, wherein at least said light source and said optical detector are located in a plastic package having a positioning mechanism;

and wherein said package is mounted on a base using said positioning mechanism.

7. The head according to claim 6, wherein said base has a hole into which said package is inserted;

and wherein an inner wall of said hole is substantially equal in shape and size to an outer wall of said package;

and wherein said inner wall of said hole has an engaging part and said outer wall of said package has a corresponding engaging part;

and wherein said package is positioned at a desired location with respect to said base by engagement between said engaging parts of said hole and said package.

8. The head according to claim 7, further comprising a heat dissipation member for dissipating heat generated by said light source.

9. An optical head, comprising:

(a) a light source that emits a light beam to be irradiated to an optical recording medium as an incident light beam;

(b) a hologram element that receives a reflected light beam generated by reflection of said incident light beam on said medium to generate at least two diffracted light beams for focusing error detection and at least two diffracted light beams for tracking error detection; and (c) an optical detector that detects the at least two diffracted light beams for focusing error detection and the at least two diffracted light beams for tracking error detection, wherein said hologram element includes at least first and second diffraction gratings, said gratings having different grating patterns and at least one of said grating patterns being arc-shaped and having an offset center with respect to another of said grating patterns, and the other of said grating patterns being linear, and wherein said first diffraction grating is disposed on a surface of said element and said second diffraction grating is disposed on an opposite surface thereof.

10. The head according to claim 9, wherein at least said light source and said optical detector are located in a package having a positioning mechanism.

11. The head according to claim 10, wherein said package is made of plastic.

12. The head according to claim 10, wherein said package is mounted on a base using said positioning mechanism.

13. The head according to claim 12, wherein said base has a hole into which said package is inserted, and wherein an inner wall of said hole is substantially equal in shape and size to an outer wall of said package, and wherein said inner wall of said hole has an engaging part and said outer wall of said package has a corresponding engaging part, and wherein said package is positioned at a desired location with respect to said base by engagement between said engaging parts of said hole and said package.

14. The head according to claim 9, further comprising a heat dissipation member for dissipating heat generated by said light source.

* * * * *